(12) United States Patent
Kato et al.

(10) Patent No.: US 6,203,731 B1
(45) Date of Patent: Mar. 20, 2001

(54) METHOD FOR INJECTION MOLDING OF PLASTIC PRODUCTS HAVING EXCELLENT TRANSCRIPTION PROPERTIES

(75) Inventors: Tsuyoshi Kato; Hirofumi Tateyama; Hideyuki Ishiyama; Kiyoshi Suzuki, all of Fukushima (JP)

(73) Assignee: Tohoku Munekata Company Limited (JP)

( * ) Notice: Subject to any disclaimer, the term of this patent is extended or adjusted under 35 U.S.C. 154(b) by 0 days.

(21) Appl. No.: 09/174,262

(22) Filed: Oct. 16, 1998

(30) Foreign Application Priority Data

Oct. 17, 1997 (JP) .................................................. 9-284817
Apr. 9, 1998 (JP) ................................................. 10-097083

(51) Int. Cl.⁷ .................................................. B29C 45/73
(52) U.S. Cl. ..................................... 264/40.6; 264/328.16
(58) Field of Search ............................ 264/40.6, 328.16, 264/328.14; 425/552, 547

(56) References Cited

U.S. PATENT DOCUMENTS

| | | | |
|---|---|---|---|
| 4,251,479 | * | 2/1981 | Pecht et al. ..................... 264/328.16 |
| 4,338,068 | * | 7/1982 | Suh et al. ........................ 264/328.16 |
| 4,340,551 | * | 7/1982 | Wada et al. ..................... 264/328.16 |
| 4,390,485 | * | 6/1983 | Yang .............................. 264/328.16 |
| 4,442,061 | * | 4/1984 | Matsuda et al. ................ 264/328.16 |
| 5,180,535 | * | 1/1993 | Yamaoka et al. ............... 264/328.16 |
| 5,516,470 | * | 5/1996 | Larsson ........................... 264/328.16 |
| 5,772,933 | * | 6/1998 | Kotzab ............................ 264/328.16 |
| 5,830,515 | * | 11/1998 | Pleasant et al. ................ 264/328.16 |
| 5,837,183 | * | 11/1998 | Inoue et al. .................... 264/328.16 |

FOREIGN PATENT DOCUMENTS

| | | |
|---|---|---|
| 7-25115 | 3/1885 | (JP) . |
| 62-15707 | 1/1987 | (JP) . |
| 62-111832 | 7/1987 | (JP) . |
| 62-208918 | 9/1987 | (JP) . |
| 63-15707 | 1/1988 | (JP) . |
| 63-15719 | 1/1988 | (JP) . |
| 8-184441 | 7/1996 | (JP) . |

* cited by examiner

Primary Examiner—Jill L. Heitbrink
(74) Attorney, Agent, or Firm—McGlew and Tuttle, P.C.

(57) ABSTRACT

If the surface of metallic mold should not be highly transcribed to the surface of product in injection molding the plastic products, the transcription defects such as weld, shrinkage, etc. are caused to the surface of product. Further, if the resin should be exposed to the surface of high temperature metallic mold more than necessary during the molding, the filler and the like of glass and so forth are contained into the resin, and in this case, they are left over on the surface of metallic mold, resulting in the transcription defect. These problems can be solved by heating the surface temperature of metallic mold higher than the glass transfer temperature of resin if the resin is non-crystal and higher than the fusion point temperature if the resin crystal, with the temperature raising speed of more than 2° C. every second, maintaining this temperature during the resin charging, and by cooling at the lowering speed of more than 2° C. every second after the completion of charging. This temperature control shall be conducted with the feed back control while detecting the surface temperature of metallic mold by the temperature detection sensor mounted at the position close to the surface of metallic mold.

20 Claims, 15 Drawing Sheets

- ■ Experiment 4 : 60°C/without pressure holding
- □ Experiment 4 : 60°C/with pressure holding
- ● Experiment 3 : 120°C/without pressure holding
- ○ Experiment 3 : 120°C/with pressure holding

Fig.13

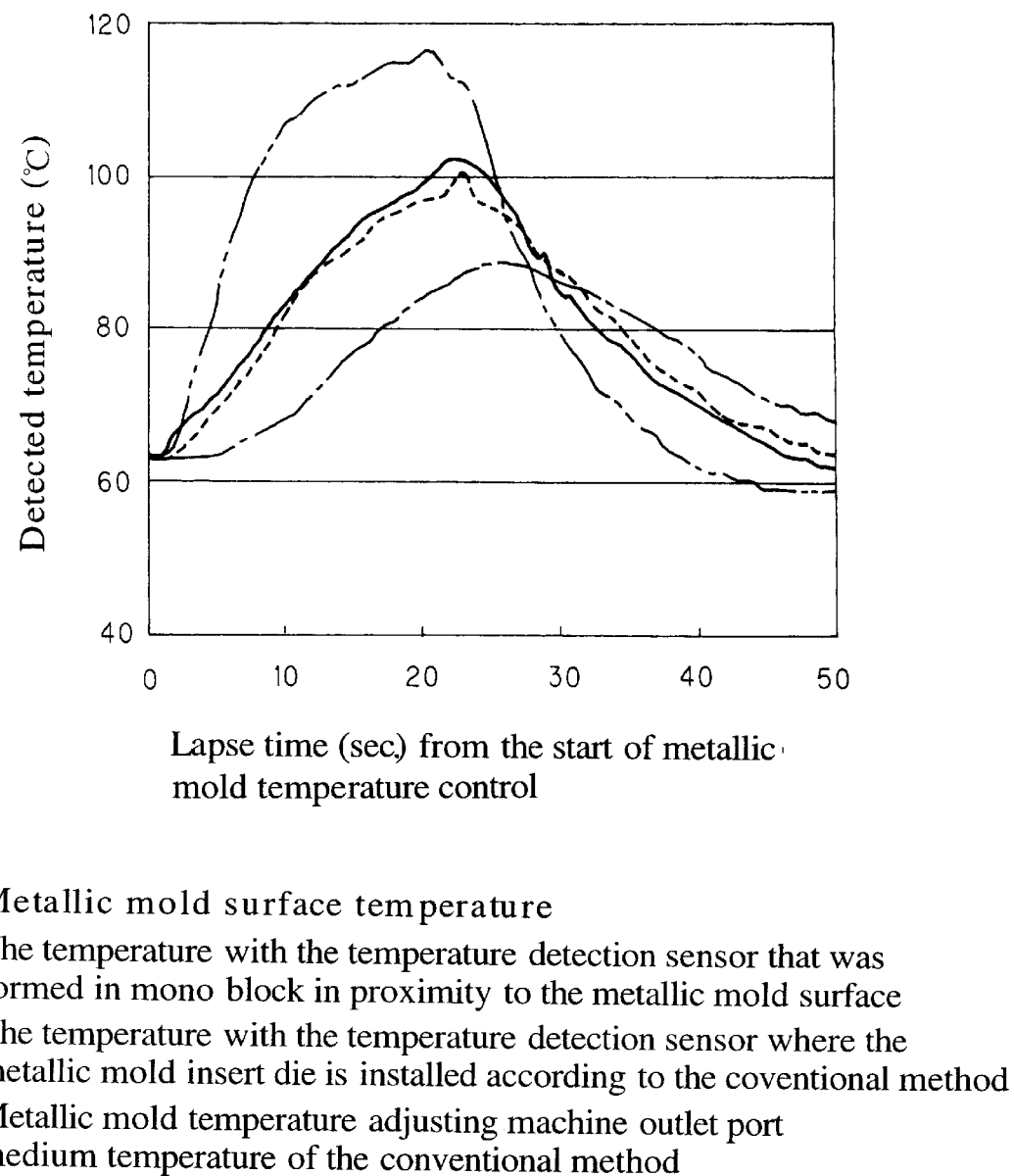

Lapse time (sec.) from the start of metallic mold temperature control

----- Metallic mold surface temperature

———— The temperature with the temperature detection sensor that was formed in mono block in proximity to the metallic mold surface — - — The temperature with the temperature detection sensor where the metallic mold insert die is installed according to the coventional method — - - — Metallic mold temperature adjusting machine outlet port medium temperature of the conventional method

METHOD FOR INJECTION MOLDING OF PLASTIC PRODUCTS HAVING EXCELLENT TRANSCRIPTION PROPERTIES

A method for injection molding of plastic products, which have excellent transcription properties as well as the metallic mold being used for this injection molding and the manufacturing method of this metallic mold.

FIELD OF THE INVENTION

The present invention relates to the injection molding method for preventing the appearance of transcription defects such as flow marks, weld marks, shrinkage, etc. to the product when the transcription between the metallic mold surface and the product surface has been done sufficiently in injection-molding the plastic products, as well as the metallic mold being used to this injection molding and also the manufacturing method of this metallic mold.

More particularly, this invention relates to the injection molding method capable of sufficiently conducting the transcription and presenting the product of high quality by controlling the temperature of the product visible face side in the metallic mold in order to perform the transcription to a full extent, to the metallic mold being used for this injection-molding and to the manufacturing method of this metallic mold.

BACKGROUND OF THE INVENTION

In the conventional plastic injection molding that is conducted while controlling the entire metallic mold at a low temperature and moreover to a certain temperature, the material resin of molten thermoplastic resin, etc. is speedily cooled down from the surface in contact with the metallic mold and a thick solidified layer is formed, or the transcription between the metallic mold surface and the product surface can not be done sufficiently attributable to the heat shrinkage, and the transcription defects such as flow marks, weld marks, shrinkage, etc. are caused. This is because the hard solidified layer of resin surface hinders the deformation due to the internal pressure of the resin, the resin surface closely adheres to the metallic mold surface and prevents the transcription.

Further, there is such a case of including such filler as glass fiber and beads, and rubber particle as butadiene, etc. into the resin for reinforcing the mechanical strength of the resin, and if these should be contained in the resin, such filler as glass, etc and rubber particle as butadiene, etc. are left over on the resin surface by its thermal shrinkage difference, forming precise irregularities, worsening the transcription properties and damaging the outside appearance of product.

This kind of transcription defect of such product not only damages the outside appearance of product to decrease the product value but also hinders the uniform coating to damage the aesthetic appearance in case of providing the coating on the product surface, and there is such a problem as the cost for repair becomes higher. Further, in an extreme case, the surface smoothness accuracy or the outside appearance being requested as to such product can not be satisfied, thus making the product to be value-less.

This kind of transcription defect can be improved to a certain degree by making the resin pressure inside the metallic mold higher, pressing the resin against the metallic mold surface, by reducing the volume of filler, rubber grain, etc. being contained into the material resin, by making the diameter of grain size smaller, or by improving the material resin itself. However, making the metallic mold internal pressure higher necessitates the use of metallic a mold of higher strength and a large type molding machine capable of generating a high pressure, and causes such new problems as the higher cost, the internal strain of product itself and the generation of deformations. Further, the improvement of the resin itself causes such a problem that the performance of necessary strength and the like can not be satisfied because the serious consideration is taken to the outside appearance.

The highest effect against the transcription defect is to heat the face of metallic mold in contact with the product to the level higher than the glass transfer temperature if the material resin is non-crystal and to heat the said face to the level higher than the fusion temperature if the resin is crystal. This is because the solidified layer of resin in contact with the metallic mold tends to become thinner and deformed and to transcript the surface of metallic mold faithfully by making the surface of the metallic mold higher in temperature.

However, if the surface of metallic mold should simply be heated, the product surface is exposed to a high temperature for a longer period than necessary, there appear such new problems as the appearance of cumber and deformation to the product, and there also appears such an harmful influence that the molding cycle is elongated and the product cost becomes higher. Also, if the necessary high metallic mold surface temperature should not be reached or if the metallic mold surface temperature should be too high, the outside appearance needed to the product and the shape accuracy are damaged, thus causing the loss in production. Therefore, it is essential not only to detect the temperature of the metallic mold surface with high accuracy but also to improve the temperature of the metallic mold, and control the heating and cooling temperatures of metallic mold surface to the targeted temperature and time with high accuracy within a short time based on the detected temperature.

Conventionally, the method for controlling the metallic mold temperature is not to directly detect the surface temperature of metallic mold, but to detect the temperature of heating thermal medium and cooling thermal medium being supplied into the metallic mold using the temperature detection sensor inserted into the medium piping surface or into the piping, thus controlling the medium temperature based on this detection temperature and controlling the metallic mold temperature. Further, as the method for directly detecting the metallic mold surface temperature, such a method is being used as installing the temperature detection sensor inside the metallic mold insert die by the machining, and fitting it into the surface of metallic mold together with this insert die.

Moreover, as the units attempting to improve the responsibility of metallic mold temperature control, to shorten the metallic mold heating time and to raise the control accuracy of metallic mold temperature, a variety of the following units are being proposed.

(1) The unit installing an induction coil around the outer circumference of metallic mold (Gazette of Japan Unexamined Utility Model Publication No. S62-111832).

(2) The unit installing a high frequency induction coil consisting of the copper pipe to the metallic mold to flow the cooling water inside the pipe (Gazette of Japanese Unexamined Patent Publication No. S63-15707).

(3) The unit where the mobile insert die provided with an electric heater can be inserted into or pulled out of the metallic mold (Gazette of Japanese Unexamined Patent Publication No. S63-15719).

(4) The unit where such a device is installed for changing over the speedily heating or cooling of the medium for metallic mold temperature control or the heated or cooled thermal medium and supplying it to the outside of metallic mold, and the heating or cooling thermal medium being supplied can heat or cool the metallic mold through the temperature adjusting medium circulation channel inside the metallic mold (Gazette of Japanese Unexamined Patent Publication No. S62-15707, Gazette of Japanese Unexamined Patent Publication No. S62-208918, Gazette of Japanese Examined Patent Publication No. H7-25115).

As described earlier, the transcription defect of the product can be improved by heating to the high temperature the surface where the material resin of metallic mold flows, but if a long time should be taken to the heating and cooling, then there may appear such new problems that the molding cycle is elongated, the productivity falls down, and the rise of product cost will be invited and the product itself will be cumbered. Further, if the control accuracy of metallic mold surface temperature should be worse, and the molding should be done at the temperature being set as the surface temperature of metallic mold, namely the glass transition temperature in case that the material resin is non-crystal, or at the metallic mold surface temperature lower than the fusion temperature in case that the resin is crystal, the transcription defect is caused to the product generating the production loss, and to the contrary, if the metallic mold surface temperature should become too high or the product has been exposed to a high temperature for many hours, the shrinkage volume of material resin becomes further greater, such rubber grains as the filler, butadiene, etc. like the glass and so forth are left over on the resin surface by the post-shrinkage, etc, and there is also a problem that the transcription defect occurs again.

Therefore, for obtaining the high transcription product, it is necessary not only to detect the surface temperature of the metallic mold with high accuracy but also to improve the temperature responsiveness of the metallic mold, and to control the heating and cooling temperatures of the metallic mold surface within a short time, with high accuracy to the targeted temperature and time on the based of the detected temperature.

However, also with the method for controlling the surface temperature of the metallic mold, in the method for detecting the temperatures of heating thermal medium and cooling thermal medium to be supplied to the metallic mold without detecting directly the surface temperature of the metallic mold like the conventional method and for controlling the thermal medium temperature based on this detected temperature to control the surface temperature of the metallic mold, there appears a difference to the temperature and the heating and the cooling time between the heating and cooling medium temperatures and the surface temperature of the metallic mold, and that difference is changed by the controlled temperature and doesn't remain constant. Therefore, it is difficult to previously predict all the temperature and time difference between these heating and cooling thermal medium temperatures and the surface temperature of metallic mold and to heat- or cool-control the surface temperature of metallic mold with high accuracy to the targeted temperature and time.

In the method for installing the temperature detection sensor into the metallic mold insert die by its machining, fitting whole the insert die into the surface of the metallic mold to detect the surface temperature of metallic mold and controlling the heating and cooling thermal medium temperatures based on this detected temperature to control the surface temperature of the metallic mold, there is the special feature capable of decreasing the timely difference of temperature and temperature change being caused between the heating and cooling thermal medium temperatures and the surface temperature of metallic mold.

However, in this system, because the temperature detection sensor is installed into the insert die and the metallic mold by its machining, there exists the gap between the temperature detection sensor and the insert die and the metallic mold, the heat transfer is worse, and because no means for controlling the temperature of the metallic mold is not installed to the insert die itself to which this kind of temperature detection sensor has been installed, like the channel passing through the heating and cooling thermal medium, etc., there appears a timely difference to the temperature and temperature change between the surface temperature of surrounding metallic mold and the detected temperature by the temperature detection sensor.

In addition to the said descriptions, because in the conventional metallic mold structure the metallic mold temperature adjusting thermal medium tube channel and the temperature detection sensor of metallic mold separates by more than several tens of millimeters from the surface of metallic mold, there appears the temperature and timely difference from this distance problem, and becomes a hindrance in controlling the surface temperature of metallic mold with high accuracy.

Further, also concerning the method attempting to improve the temperature responsibility of the metallic mold, to shorten the heating time of the metallic mold and to enhance the control accuracy of the metallic mold temperature, there are some problems as follows to the conventional method.

The above mentioned unit of Items (1) and (2) installing the induction coil has many restrictions for its incorporation into the metallic mold, and the metallic mold is enlarged. The unit in Item (3) that has installed a mobile insert die having an electric heater must provide the insertion area of mobile insert die on the metallic mold, and the structure of metallic mold becomes complex. In addition, this unit has no universality to the heating means. Further, because the natural cooling is adopted, the molding cycle becomes longer. The unit in Item (4) for heating and cooling the surface of metallic mold by passing the heating and cooling thermal media through the temperature adjusting thermal medium circulation pipe channel from the outside unit has the universality, and there is also such a merit that the structure of the metallic mold requires no special machining. However, if the temperature adjusting thermal medium circulation channel inside the metallic mold in the range which is usually installed should be used, the thermal capacity of heating or cooling metallic mold portion is great and hence there appears the loss of heat, and the time is required for heating and cooling. Further, to the end there is such a problem that the control accuracy of temperature becomes worse because the response of surface temperature of metallic mold is late.

SUMMARY AND OBJECTS OF THE INVENTION

The first object of this invention is to obtain at a low pressure the high transcription plastic products by paying attention to the surface temperature of metallic mold and the control of this temperature during the injection molding.

The second object of this invention is to obtain the metallic mold having the temperature detection sensor and the thermal medium flow channel capable of controlling the surface temperature of metallic mold with high accuracy when molding the high transcription plastic products.

The third object of this invention is to obtain the metallic mold manufacturing method capable of molding the high transcription plastic products by controlling the surface temperature of metallic mold.

BRIEF DESCRIPTION OF THE DRAWINGS

FIG. 13 is an explanatory view of comparison example of detected temperatures.

BRIEF DESCRIPTION OF THE PREFERRED EMBODIMENTS

Figure 1:
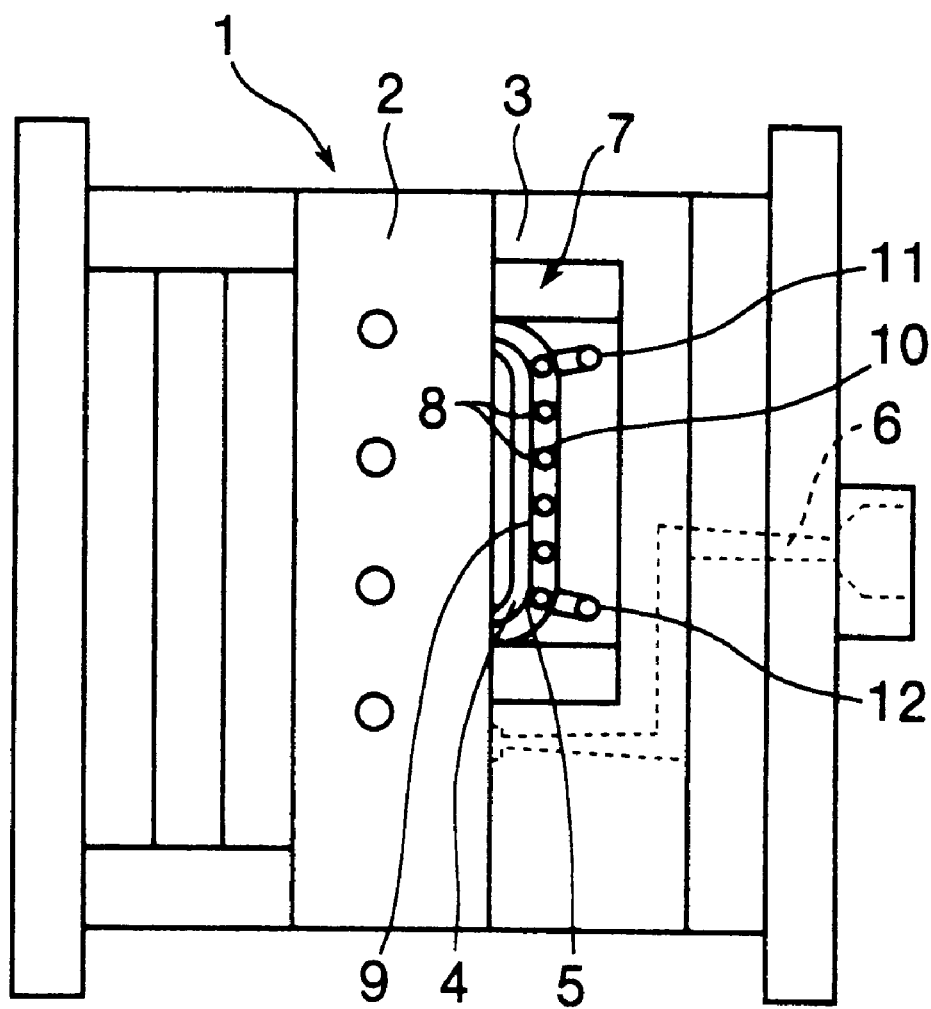
FIG. 1 is a cross sectional drawing showing an example of injection molding metallic mold relating to the embodiment of molding method according to this invention.

For solving the above mentioned problems, the inventors ardently studied the molding method to be performed by making the metallic mold surface in contact with the product to be at a high temperature, the metallic mold structure being advantageous as to temperature responsiveness and the manufacturing method. As a result, in the injection molding method, the inventors et al have completed the injection molding method of plastic product capable of obtaining the high transcription product at a low temperature without postponing the molding cycle by conducting the cycle of metallic mold temperature of speedily heating at the temperature rise speed of more than 2° C. every second the metallic mold surface in contact with the product within a short time up to the level higher than the glass transfer temperature if the material resin is non-crystal and up to the level higher than the fusion temperature if the resin is crystal, of maintaining this temperature while charging the resin, and of speedily cooling down within a short time the metallic mold surface at the temperature lowering speed of more than 2° C. every second after the completion of resin charging.

The structure of metallic mold and the manufacturing method that makes it possible to speedily heat and cool the metallic mold face in this way were described into details in these inventors' patent applications (Japanese Patent Application No. H8-184441, application date on Jul. 15, 1996) in the past.

Moreover, this molding method can also be applied to the gas assist molding, compression molding method, etc. in addition to the general injection molding method.

As the resins to which the molding by metallic mold of this invention can be applied, not only such universal type resins as the poly-olefin resin, polystyrene resin, ABS resin and such industrial resins as the poly-carbonate resin and poly-amid resin, but the mixture of various resins and the resin mixing the organic, inorganic fillers and moreover the foam agent for providing the feeling of metallic and grain tone as the reinforcing material or the design property can also be used.

As described above, in the injection molding, if the molding method for speedily heating the metallic mold face in contact with the product to the level higher than the glass transfer temperature within a short time if the material resin is non-crystal and to the level higher than the fusion temperature if the resin is crystal, for maintaining this temperature during the resin charging, and speedily cooling it down within a short time after the completion of charging should be used, the consolidation layer of resin surface in contact with the metallic mold surface that was heated to the high temperature during the charging is unlikely to develop and is thinner and likely to deform in comparison with the conventional molding at the lower metallic mold surface temperature. For this reason, the resin surface adheres to the metallic mold surface easily with the internal pressure of the resin, and its transcription becomes better. Moreover, by the adhesion, a high physical joint strength can be obtained between the resin and the metallic mold surface, the separation of resin is delayed, and the solidification layer develops to the sufficient strength in the meantime, and hence there is less of an influence attributable to the thermal shrinkage of the resin. For this reason, the transcription defect attributable to the residue to the resin surface of such filler as glass and such rubber particle as butadiene smaller in the shrinkage among the material resin isn't generated, and the products of high transcription can be obtained.

Moreover, because the resin surface is likely to get deformed, the resin internal pressure necessary for pressing the resin surface against the metallic mold face for its transcription may be lower. And since the solidification layer of resin is thin, the pressure loss of resin is small, and it is possible to mold the resin at the lower metallic mold internal pressure than the conventional molding method.

Further, the reason why it is essential to speedily heat and cool down the metallic mold face and to suppress the time for the resin to be exposed to a high temperature metallic mold face to the necessary minimum limit that is especially a feature of this invention is to be described into details hereunder.

If the material resin should be exposed to the high temperature metallic mold face for the time longer than necessary, the shrinkage volume of material resin becomes further greater, and the substances mingled into such resins of filler like glass and rubber particles like butadiene are left over on the resin surface by the post-shrinkage and the like, and the transcription defect occurs again.

Furthermore, if the resin should be molded with the metallic mold surface being raised to a high temperature, the deformation like the cumber tends on appear to the products should the cooling be slow in speed.

Moreover, if the heating and cooling of metallic mold surface can not be achieved within a short time, the molding cycle is elongated, which damages the mass-production and invites the increase of cost.

[Embodiment 1]

Some preferred embodiments of the above mentioned invention are to be explained next.

FIG. 1 is an outline diagram showing an embodiment of plastic injection molding metallic mold in case of conducting the molding method of this invention.

The plastic injection molding metallic mold 1 shown in FIG. 1 consists roughly of the core 2 (the non-visible face side of product) and the cavity 3 (the visible face side of product), they are both coupled to the injection molding machine beyond the figure, and the core 2 and the cavity 3 can be opened and closed. The concave portion 5 responsive to the outside shape of product 4 is formed to the core 2 and the cavity 3, and the molten plastic flows into the concave portion 5 from the injection molding machine outside the figure via the sprue 6 provided at the stipulated location of cavity 3 so that the product 4 may be molded. The product visible face side of this product 4 is speedily heated to the high temperature and cooled down during the molding by the medium flowing into the metallic mold temperature adjusting medium circulation channel 8 inside the metallic mold surface high speed heating and cooling insert die piece 7, and is taken out of the plastic injection molding metallic mold 1 after its solidification. For information, the medium flowing inside the metallic mold temperature adjusting medium circulation channel 8 is equipped with a high frequency heater and a cooler outside the figure, is supplied to the metallic mold temperature adjusting medium circulation channel 8 via the medium inlet port 11 from the medium temperature adjusting machine where the high speed heating and cooling are available, and circulated to the medium temperature adjusting machine via the medium outlet port 12.

Figure 2:
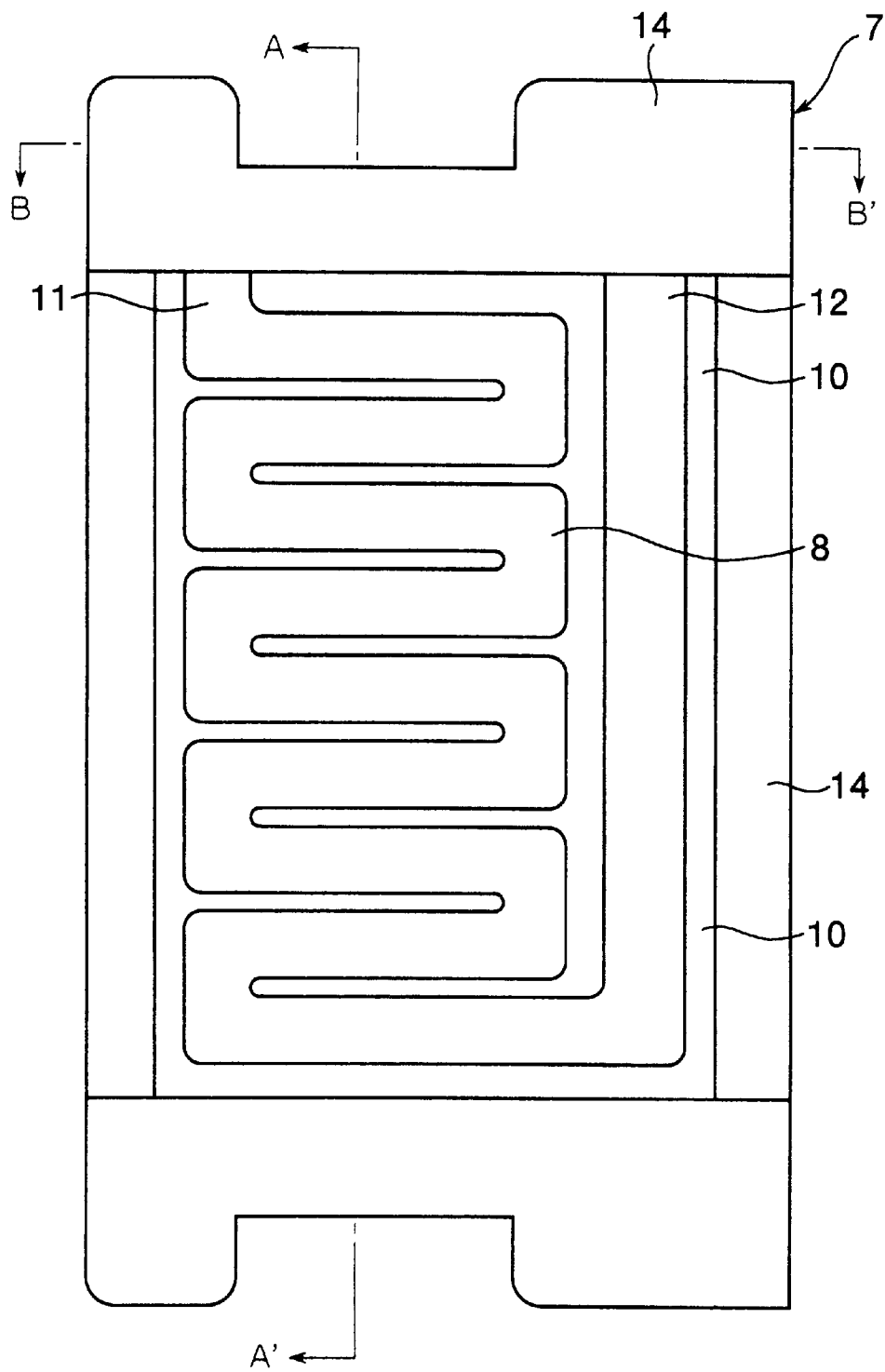
FIG. 2 is a cross sectional drawing viewing from the rear face side (the side opposite to the product face) the metallic mold surface high speed heating and cooling insert die piece.
Figure 3:
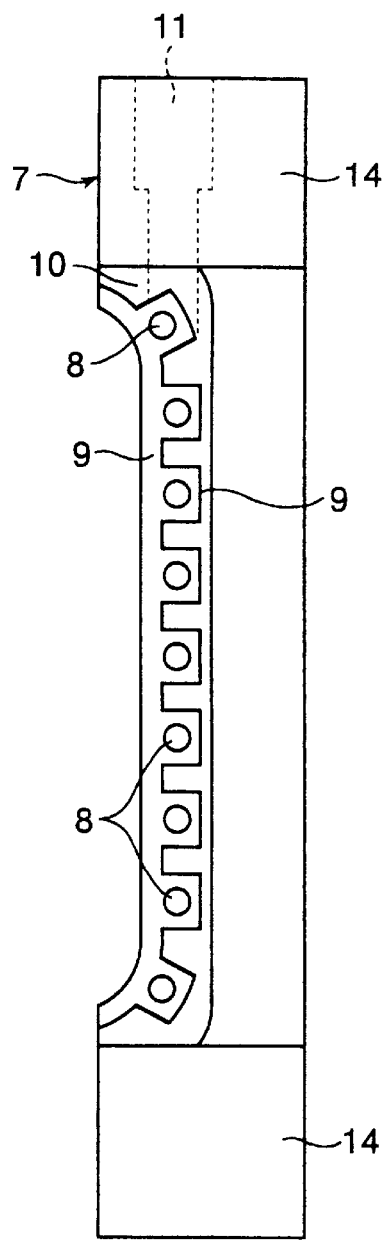
FIG. 3 is a cross sectional view taken along the line A–A'.
Figure 4:
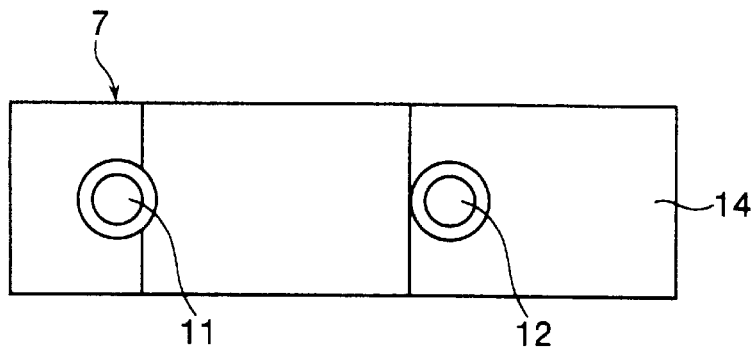
FIG. 4 is a cross sectional view taken along the line B–B'.

FIG. 2, FIG. 3 and FIG. 4 are the explanatory views of the metallic mold surface high speed heating and cooling insert die piece 7 shown in FIG. 1. The metallic mold surface electric cast layer 9 in contact with the product visible face is made of Ni—Cr, and the metallic mold temperature adjusting medium circulation channel 8 is formed in the interior. This metallic mold temperature adjusting medium circulation channel 8 shields the surface with the electric casting layer 9 after forming the pipe channel with the lost wax on the internal face of metallic mold of metallic mold surface electric casting layer 9, thereafter, eludes the lost wax to make it a cavity, and is made to be a mono-block structure together with the metallic mold surface electric casting layer 9. The cross sectional shape of metallic mold temperature adjusting medium circulation channel 8 is a square of 5 mm×5 mm and its pitch is 12 mm. The distance between the surface of this metallic mold temperature adjusting medium circulation channel 8 and the surface of metallic mold surface high speed heating and cooling insert die piece 7 in contact with the product 4 has been set to 2 mm. Further the heat insulation layer 10 being structured of the epoxy and reinforcing material of about 2 mm thickness is provided to the rear face of metallic mold temperature adjusting medium circulation channel 8, and the heat capacity was structured to a small size by thermally isolating the metallic mold portion conducting the sudden heating and cooling. Numeral 14 in the figure is a steel material.

Figure 8:
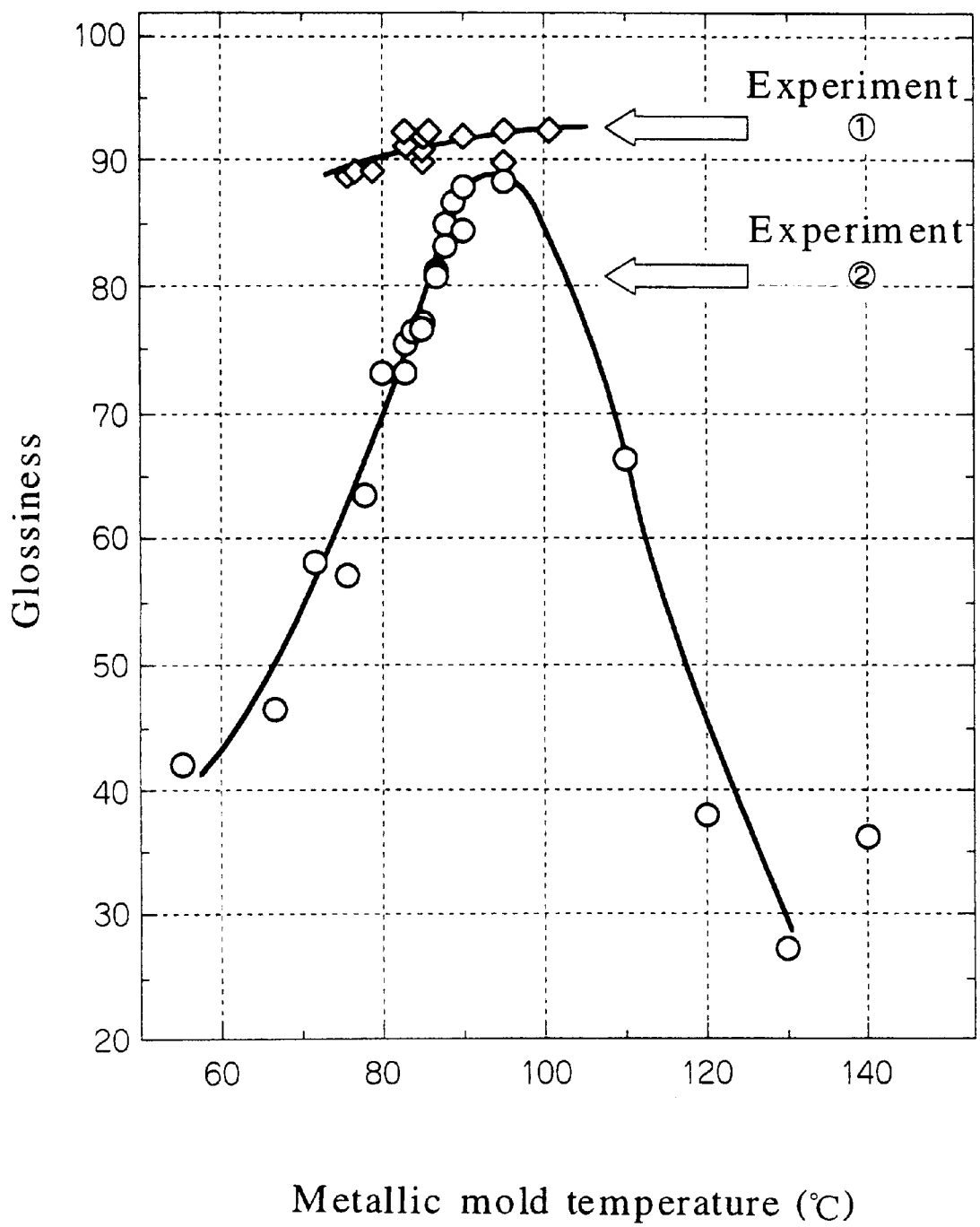
FIG. 8 is an explanatory drawing of comparison example in glossiness.

The product visible face side metallic mold surface temperature was changed to the level around the resin glass transfer temperature and the injection molding was conducted using the unit in FIG. 1 and the ABS resin containing 20% of glass filler (15G20, glass transfer temperature at 98° C., Japan Synthesis Rubber). At this time, the metallic mold surface temperature was set to the conditions (Experiment 1) of cooling it down within a short time after heating it until the completion of resin charging. Further, the molding cycle (metallic mold closing—injection—pressure holding—cooling—metallic mold opening—taking out the molded product) at this time was set to 60 seconds, the time required for the heating was 18 seconds, the time required for the cooling was 25 seconds, and the temperature raising speed of metallic mold surface temperature was set to 2° C. every second and the temperature lowering speed was set to 2° C. every second. The visible face glossiness measured result of obtained product is shown in FIG. 8.

In the above mentioned Experiment 1, the metallic mold surface temperature during the resin charging was raised to the level higher than the glass transfer temperature of resin and moreover at the temperature raising and cooling speeds at 2° C. every second, and the product face glossiness at 92 became the maximum value, thus the product of high glossiness could be obtained despite of the inclusion of glass filler. The glossiness is an index of transcription property, and the high transcription property could be obtained by speedily cooling down the metallic mold face after heating it up to the level higher than the glass transfer temperature of resin. At the point of time when taking out the product, the product has sufficiently been solidified, and there appeared no deformation and mold separation problems such as the cumber of product.

[Embodiment 2]

Figure 9:
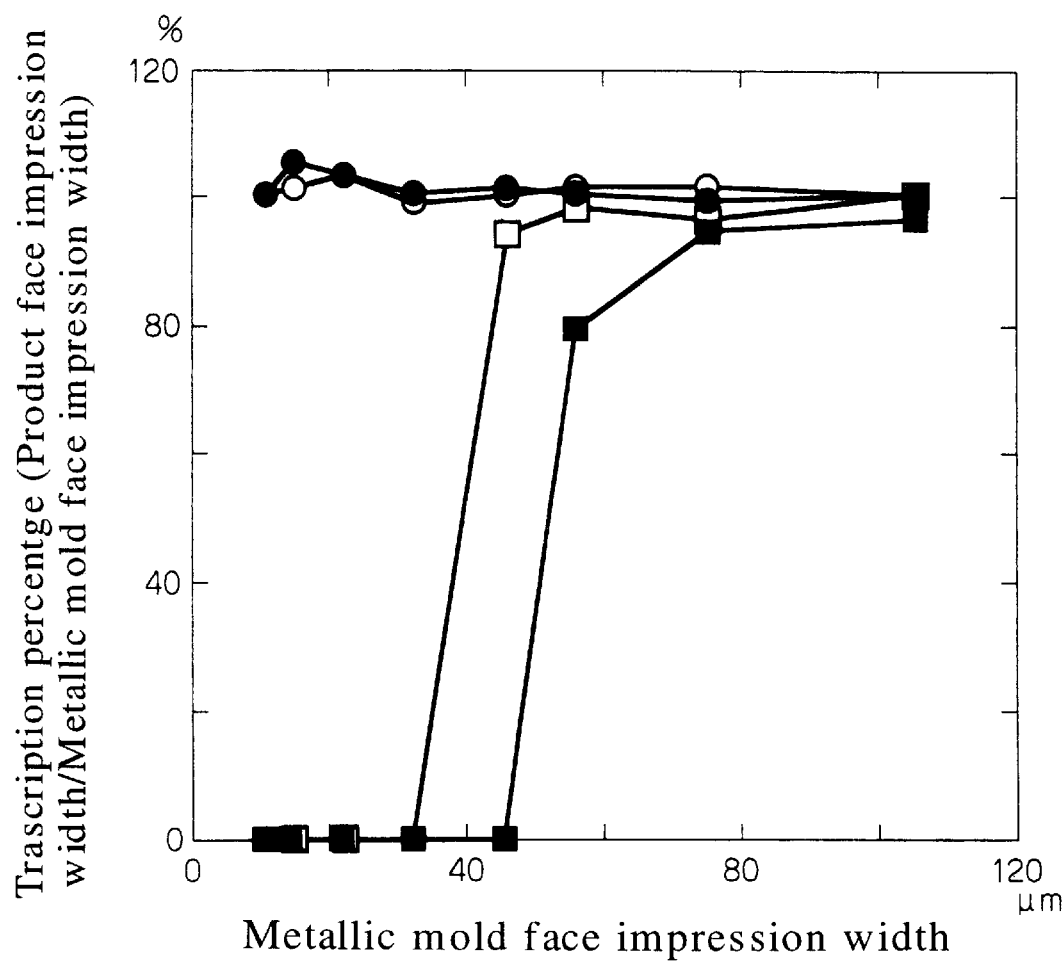
FIG. 9 is an explanatory drawing of comparison example of transcription percentage.

The product visible face side metallic mold surface temperature was speedily heated up to 120° C. during the resin charging and speedily cooled down to 60° C. during cooling and the injection molding was conducted (Experiment 3) using the same unit as Embodiment 1 and the impact resistance polystyrene (HT560, glass transfer temperature at 97° C., Idemitsu Petroleum Chemical). Further, the molding cycle (metallic mold closing—injection—pressure holding—cooling—metallic mold opening—taking out the product) at this time was set to 60 seconds, the time required for heating was 18 seconds, the time required for cooling was 25 seconds, and the temperature raising speed of metallic mold surface temperature was set to 3° C. every second with the temperature lowering speed being set to 2° C. every second. For information, the impression of different size square cone shape was previously given on the metallic mold surface using a diamond tip, the width of impression between the metallic mold surface and the resin surface was measured, and the transcription property was evaluated with the ratio (resin surface impression width/metallic mold surface impression width) of this width as the transcription percentage. FIG. 9 shows the measured result of impression transcription percentage of obtained product and metallic mold.

In the above mentioned Experiment 3, the transcription percentage indicated a high value at approximately 100% in any of size different square cone shape impressions from 10 microns to 100 microns. Further, the approximately same transcription percentage was obtained in any of the conditions where the pressure holding exists or not, and the high transcription property could be obtained at a low pressure without requiring any pressure holding.

The product visible face side metallic mold surface temperature was changed to the level around the resin glass transfer temperature and the injection molding was conducted using the same experiment unit and resin as Embodiment 1. At this time, the metallic mold surface temperature adopted the conditions (Experiment 2) of controlling to the constant temperature from the charging to the cooling of resin. The molding cycle (metallic mold closing—injection—pressure holding—cooling—metallic mold opening—taking out the product) at this time was for 60 seconds, the time required for heating was 18 seconds, the time required for cooling (the heated temperature is to be kept to a constant temperature) was 25 seconds, the temperature raising speed of metallic mold surface temperature was set to 2° C. every second and the temperature lowering speed was set to 0° C. every second for keeping the heated temperature to a constant level. The visible face glossiness measured result of obtained product is shown in FIG. 8.

Also in the said Experiment 2, the product of high glossiness could be obtained with the glossiness of product visible face being about 90 in the vicinity where the metallic mold surface temperature is around the glass transfer temperature of resin despite of the inclusion of glass filler, but the glossiness has fallen down as compared with Embodiment 1. Further, if the metallic mold surface temperature should be raised over the glass transfer temperature of resin, the glossiness of product visible face conspicuously fell down and moreover the product didn't get sufficiently solidified at the point of time when taking out the product, and there appeared the deformation and mold separation problems such as the cumber of product.

COMPARISON EXAMPLE 2

Figure 5:
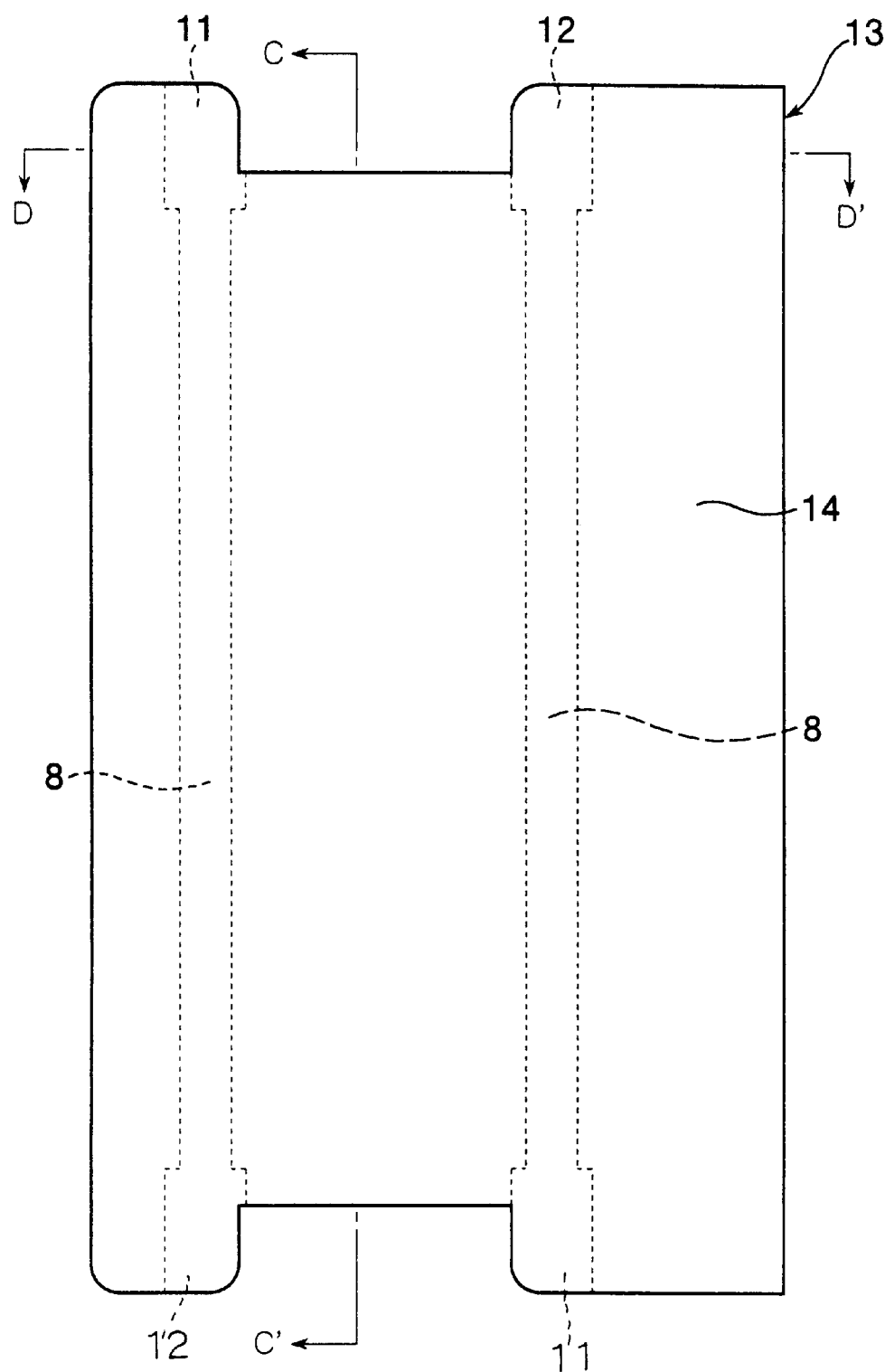
FIG. 5 is a cross sectional drawing viewing from the rear face side (the side opposite to the product face) the steel material insert die piece that was used in Comparison Example 2.
Figure 6:
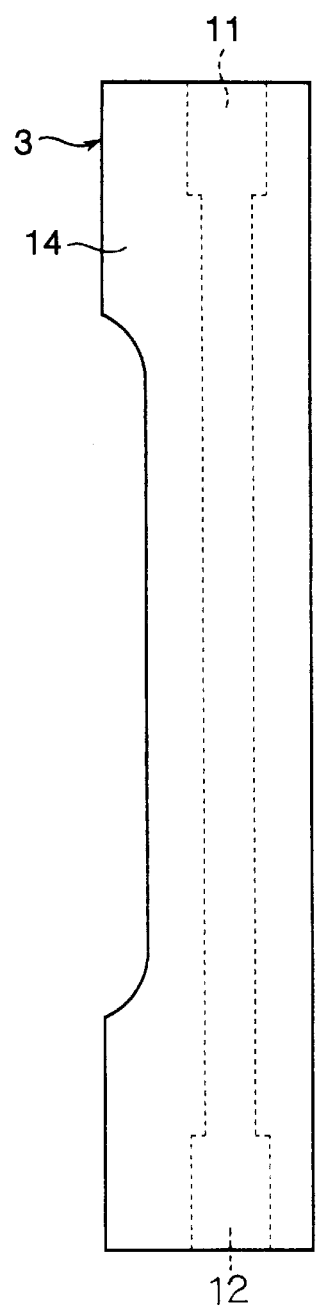
FIG. 6 is a cross sectional view taken along the line C–C'.
Figure 7:
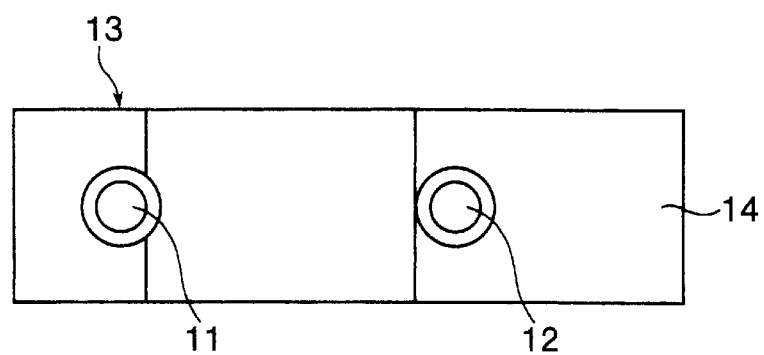
FIG. 7 is a cross sectional view taken along the line D–D'.

Using the same unit and resin as that of Embodiment 1 except for replacing the metallic mold surface high speed heating and cooling insert die piece 7 of Embodiment 1 with the steel material insert die piece 13 (FIG. 5 through FIG. 7) that simulated the usual metallic mold structure made of steel material S55C where two metallic mold temperature adjusting medium circulation channels 8 are machined to the tunnel status, the molding was conducted under the temperature control conditions of heating the product visible face side metallic mold surface temperature during the resin charging to the level around the glass transfer temperature and cooling it down to 60° C. during the cooling.

When the metallic mold face has been heated up to 100° C., the luster of product face indicated the maximum value, and if the metallic mold face temperature should be lower than or higher than the said value, the glossiness, namely, the transcription property indicated the tendency to decline. Moreover, the molding cycle (metallic mold closing—injection—pressure holding—cooling—metallic mold opening—taking out the product) when the metallic mold face has been heated to 100° C. was for 84 seconds, the time required for heating was 39 seconds, the time required for cooling was 40 seconds and the temperature raising speed of metallic mold surface temperature was 1° C. every second with the temperature lowering speed being at 1° C. every second. The molding cycle was also elongated by 40% as compared with that of Embodiment 1. The glossiness measured value of product visible face has fallen down to the glossiness of 88 in comparison with the product glossiness at 92 of Embodiment 1.

To the contrary, if the molding cycle was set to 60 seconds in the same way as that of Embodiment 1, the reach temperature of metallic mold surface was low and the product luster conspicuously fell down, and the product was likely to get deformed because the cooling of metallic mold surface was slow and the product temperature when taking out the product was higher.

COMPARISON EXAMPLE 3

The injection molding was conducted (Experiment 4) with the product visible face side metallic mold surface temperature being set to 60° C. at constant using the same unit and resin as those of Embodiment 2. FIG. 9 shows the result of measuring the impression transcription percentages of obtained product and metallic mold.

In the said Experiment 4, the transcription percentage proved to be 0% in the square cone impression smaller than 30 microns. Further, under the conditions of pressure holding presence, the transcription percentage can be slightly improved in comparison with the conditions of no pressure holding, but a high transcription percentage like that of Embodiment 2 could not be obtained. The above expounded Embodiments 1 and 2 and Comparison Examples 1 through 3 correspond to the inventions described in Claims 1 through 4.

On the other hand, the following expounded explanation of the invention and Embodiments 3 through 8 correspond to the inventions described in claims 5 through 11.

The inventions described in Claims 5 through 11 are characterized in that the temperature detection sensor is directly assembled into the molding surface material layer of this metallic mold in the injection molding metallic mold and this temperature sensor is brought as much close as possible to the molding surface and is integrated with the molding surface material layer.

Furthermore, in the manufacturing method of plastic injection molding metallic mold, the temperature detection sensor is directly assembled into the electric casting layer by arranging the temperature detection sensor at the position as much close as possible to the molding surface inside the molding surface material layer of metallic mold in the midway of forming this electric casting layer when forming the molding surface material layer of metallic mold with the electric casting layer. And next, the thermal medium pipe channel stripe is formed on the rear face of molding surface material layer of metallic mold using the hollow molding material that can be eluted later, and moreover after the electric cast layer has been formed on the outside of this thermal medium pipe channel stripe, the said hollow molding material is eluted, and the temperature detection sensor and the thermal medium pipe channel are formed in mono block inside the molding surface material layer of metallic mold. The preceding invention is characterized in the said two respects.

Furthermore, in the injection molding method of plastic products to be done while controlling the metallic mold temperature, the present invention is characterized in that the temperature detection sensor is not only brought as much close to the surface of molding surface material layer of metallic mold for its direct assembly thereunto but the temperature of thermal medium being supplied to the said thermal medium pipe channel of metallic mold from the metallic mold temperature adjusting machines is controlled on the basis of the molding surface temperature of metallic mold detected with the said temperature detection sensor using the metallic mold formed in mono block with thermal medium pipe channel, for its control to the level higher than the fusion point of resin if the material resin is crystal and to the level higher than the glass transfer temperature if the material resin is non-crystal, the heating thermal medium is controlled so that the surface temperature of metallic mold may become the temperature rise speed higher than 2° C. every second, and after maintaining this temperature during the time of resin charging, the temperature of cooling thermal medium being supplied to the metallic mold after the completion of charging may be controlled so that the surface temperature of metallic mold may fall down at the temperature falling speed higher than 2° C. every second.

In the said invention, these inventors propose in the following patent applications the structure of metallic mold and its manufacturing method nice in the temperature responsibility that can also speedily heat or cool the surface of metallic mold. Japanese Patent Application No. H9-284817 and Japanese Patent Application No. H8-184441.

Moreover, the said invention can not only be applied to the general injection molding method but also to the gas assist molding, compression molding method and the like.

As the resins to which the plastic injection molding method of this invention and its unit can be applied, it is possible to use the resin where a variety of resins are mixed, the resin where the reinforcing materials or the organic and inorganic fillers and moreover the foam agent are mingled for providing the metallic and stone grain tone feeling as the design property are mingled in addition to the universal purpose resin such as the polyolefin resin, polystyrene resin, ABS resin, etc. and the industrial resins such as the polycarbonate resin, polyamide resin, etc.

In the injection molding as described above, if the surface temperature of targeted metallic mold and the profile to be set with the metallic mold temperature controller, namely the surface temperature of metallic mold should be cooling—temperature controlled at high speed and at high accuracy within a short time with the surface temperature of metallic mold at the temperature falling speed of more than 2° C. every second after the completion of resin charging after controlling the heating temperature at a high speed and moreover with nice accuracy within a short time with the temperature raising speed of more than 2° C. every second up to the level higher than the fusion point temperature of resin if the material resin is crystal or up to the level higher than the glass transfer temperature of resin if the material resin is non-crystal, by controlling the heating and cooling temperature of heating and cooling thermal media being supplied to the metallic mold from the metallic mold temperature adjusting machine on the basis of the surface temperature of metallic mold detected with the said temperature detection sensor using the temperature detection sensor being formed in mono block with the surface of metallic mold in proximity to the surface of metallic mold and the heating and cooling thermal medium pipe channel being supplied to metallic mold from the metallic mold temperature adjusting machine, the solidification layer of resin surface in contact with the surface of metallic mold being heated and controlled to the surface temperature of metallic mold targeted with high accuracy during the resin charging is unlikely to develop and is likely to get deformed thin as compared with the molding at the surface temperature of conventional low temperature metallic mold. Thus, the transcription percentage can be improved because the resin surface easily adheres to the surface of metallic mold by internal pressure of resin. Moreover, because a high physical joint strength can be obtained between the resin and the surface of metallic mold by the adhesion, and the separation of resin from the mold is delayed and the solidification layer develops up to the sufficient strength in the meantime, the influence by thermal shrinkage of resin is less. For this reason, the transcription defect attributable to the selective residue to the resin surface of such a filler as glass and the like and the rubber particle like the butadiene, etc. small in the shrinkage doesn't appear in the material resin, and the product of high transcription can be obtained.

Moreover, because the resin surface is likely to get deformed, the resin internal pressure necessary for pressing the resin surface against the surface of metallic mold for its transcription may be lower, and because the solidification layer of resin is thin, the pressure loss of resin is small and the molding with the lower metallic mold internal pressure than the conventional method is possible.

Further, not only by detecting the surface temperature of metallic mold with high accuracy which is especially the special feature of this invention but also by improving the temperature responsibility of metallic mold and controlling the heating and cooling temperature to the targeted temperature and time with high accuracy within the short time of the surface of metallic mold based on the detected temperature, the problematic points as follows can be improved.

If the material resin should be exposed for a time that is more than necessary to the surface of high temperature metallic mold, the shrinkage volume of material resin becomes further greater, the substances mingled into the resin such as the filler of glass, etc., and the rubber particle and the like of butadiene, etc. are left over on the resin surface by the post-shrinkage, and the transcription property defect occurs again. In this case, such problems of productivity and consumed energy are caused that the molding cycle is elongated, an extra energy becomes necessary, and the product cost is also increased. Also, if the detection of surface temperature of metallic mold or the control accuracy of metallic mold temperature should be worse and should not reach the necessary high metallic mold surface temperature, the outside appearance and shape accuracy which is necessitated to the product will be damaged and the loss of production will be caused. Furthermore, if the change-over to the cooling should be late when the molding is to be made by making the metallic mold surface to be high temperature, the deformation of cumber and the like tends to appear to the product.

Some preferred embodiments of this invention is to be explained into details hereunder.

[Embodiment 3]

Figure 10:
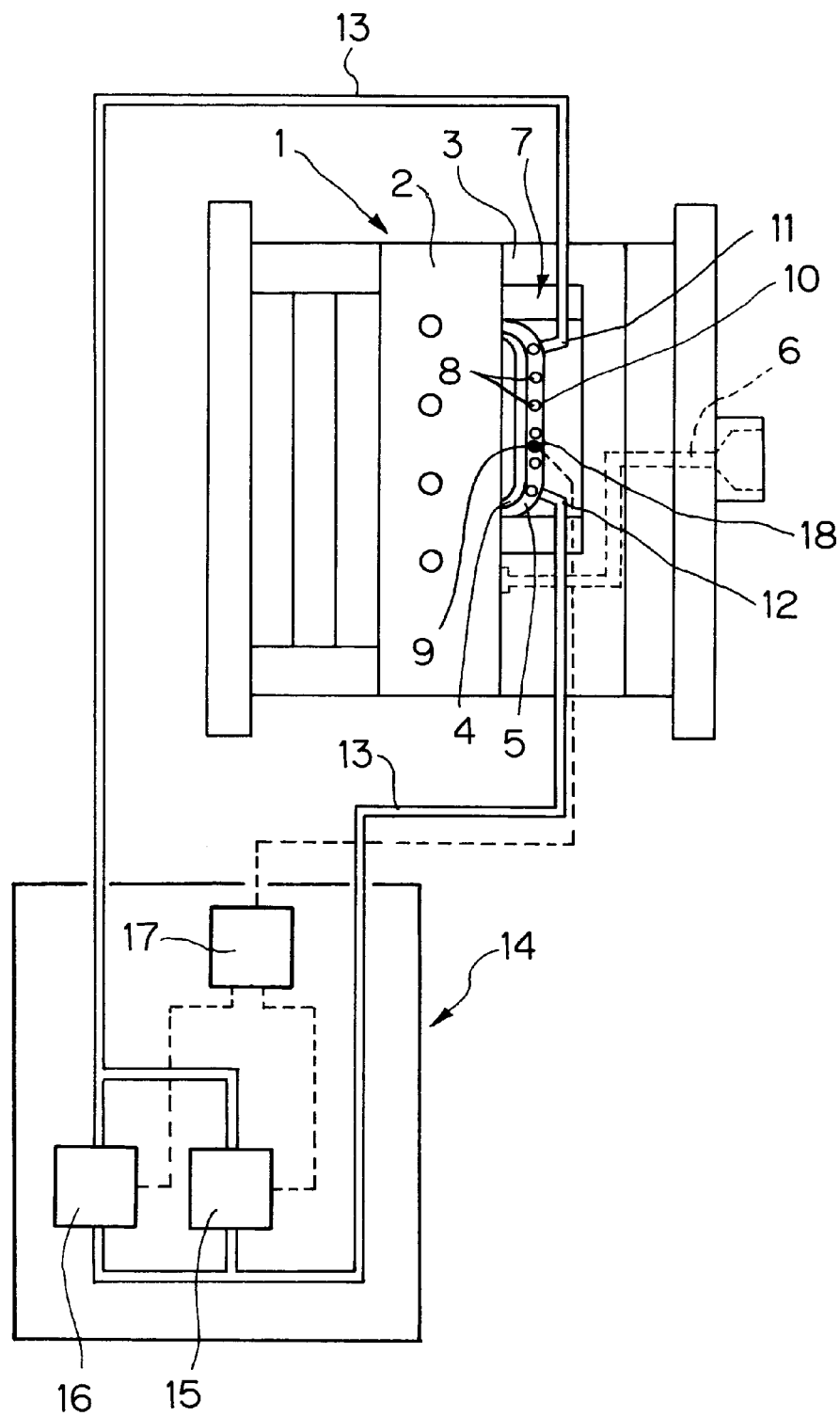
FIG. 10 is a cross sectional view showing an example of injection molding metallic mold relating to the embodiment of molding method of this invention.

The details of this embodiment are to be explained with reference to FIG. 10 through FIG. 12. FIG. 10 is a schematic diagram showing an embodiment of plastic injection molding metallic mold relating to this invention.

The plastic injection molding metallic mold 1 shown in FIG. 10 roughly consists of the core 2 (product non-visible face side) and the cavity 3 (product visible face side), they are both coupled to an injection molding machine beyond the figure, and the core side 2 and the cavity side 3 can be opened and closed. The concave portion 5 corresponding to the outside shape of product 4 is formed to the core 2 and the cavity 3, the molten plastic flows into the concave portion 5 from the injection molding machine beyond the figure via the sprue 6 installed at the stipulated location of cavity 3, so that the product 4 may be molded. The product visible face side of this product 4 is heated to a high temperature and cooled down at high speed during the molding by the thermal medium flowing inside the metallic mold temperature adjusting thermal medium circulation pipe channel 8 inside the metallic mold surface high speed heating and cooling insert die piece 7, and is taken out of the plastic injection molding metallic mold 1 after its solidification. The thermal medium flowing inside the metallic mold temperature adjusting thermal medium circulation pipe channel 8 inside the metallic mold surface high speed heating and cooling insert die piece 7 is heated up and cooled down via the metallic mold temperature adjusting thermal medium heating unit 15 and the metallic mold temperature adjusting thermal medium cooling unit 16 inside the metallic mold adjusting machine 14, and is supplied to the metallic mold surface high speed heating and cooling insert die piece 7.

Furthermore, the metallic mold temperature controller 17 inside the metallic mold temperature adjusting machine 14 controls the outputs of metallic mold temperature adjusting thermal medium heating unit 15 and the metallic mold temperature adjusting medium cooling unit 16 so that it may become the preset metallic mold temperature based on the surface temperature of metallic mold being detected by the metallic mold temperature detection sensor 18 that is previously buried in as much close as possible to the surface of metallic mold inside the surface electric casting layer 9 of metallic mold within the metallic mold surface high speed heating and cooling insert die piece 7, and that is formed integral with the surface of metallic mold, controls the medium temperature flowing inside the metallic mold temperature adjusting thermal medium circulation pipe channel 8.

Figure 11:
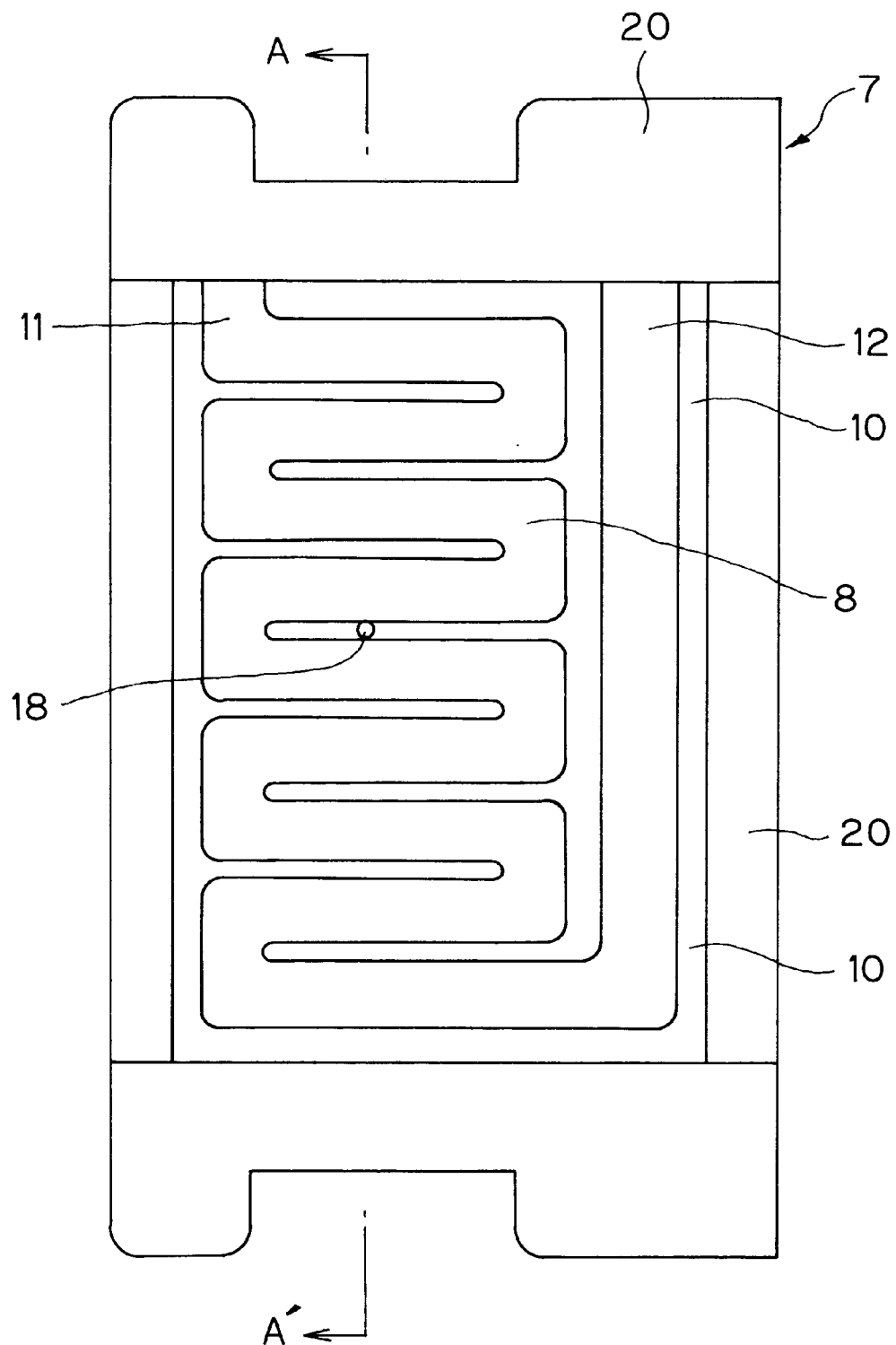
FIG. 11 is a cross sectional drawing viewing from the rear face side (the side opposite to the product face side) the metallic mold surface high speed heating and cooling insert die piece.
Figure 12:
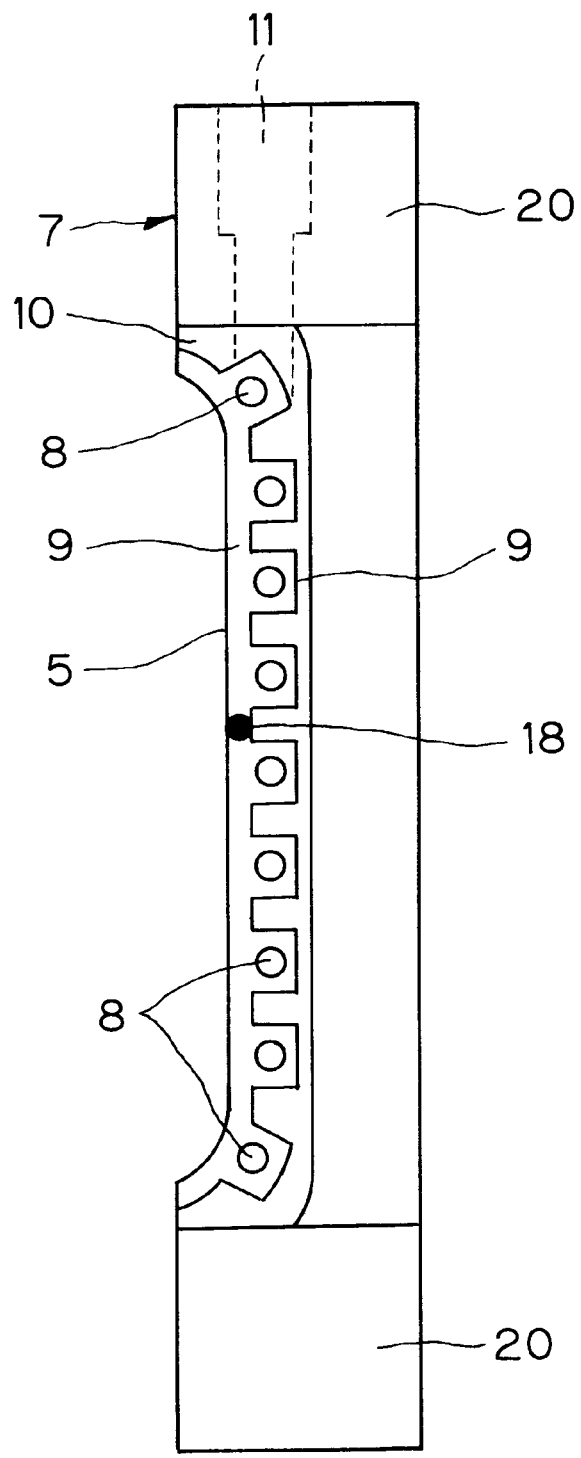
FIG. 12 is a cross sectional view taken along the line E–E'.
Figure 14:
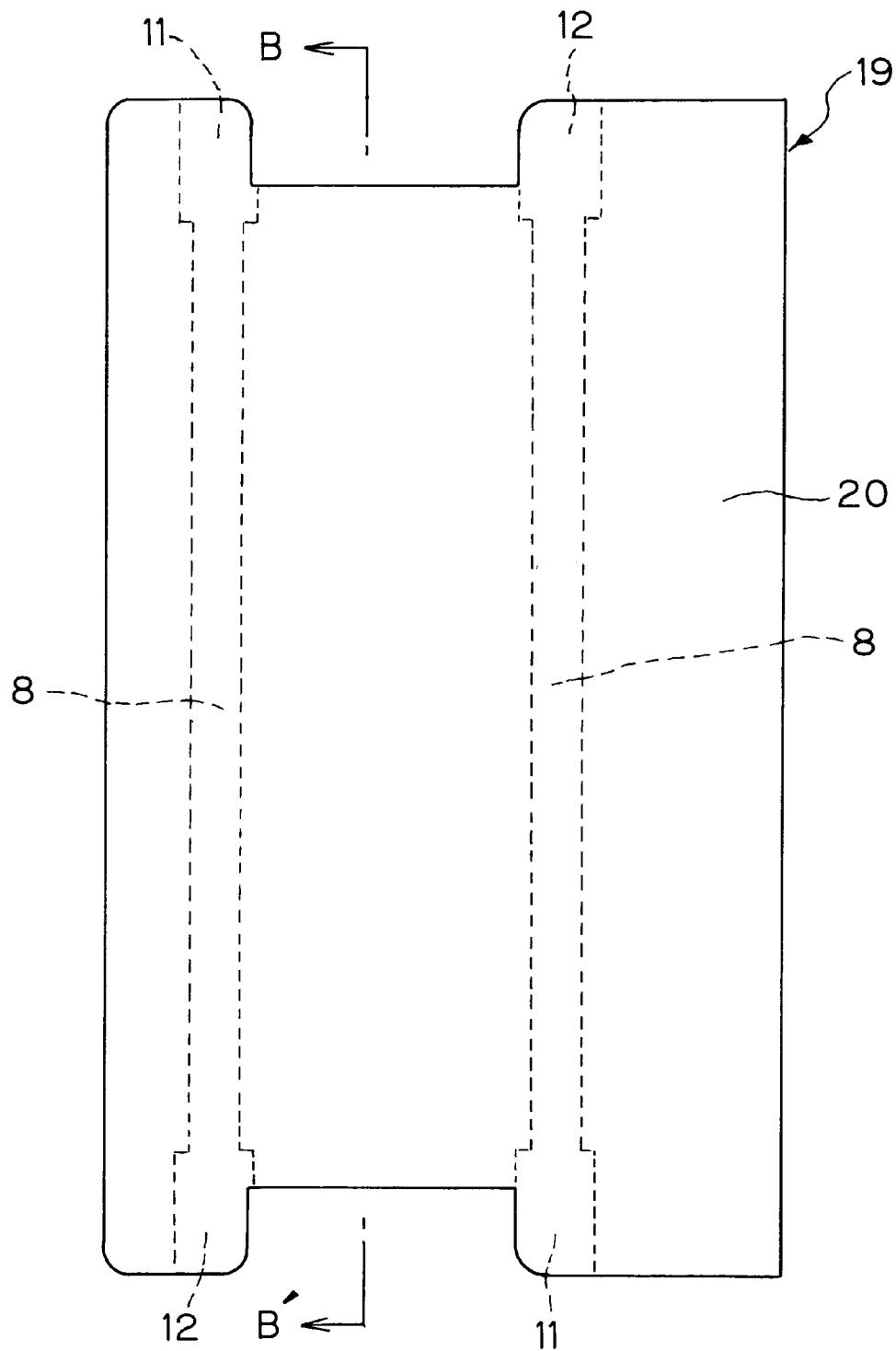
FIG. 14 is a cross sectional drawing viewing from the rear face side (the side opposite to the product face side) the steel material insert die piece that was used in Comparison Example 7.
Figure 15:
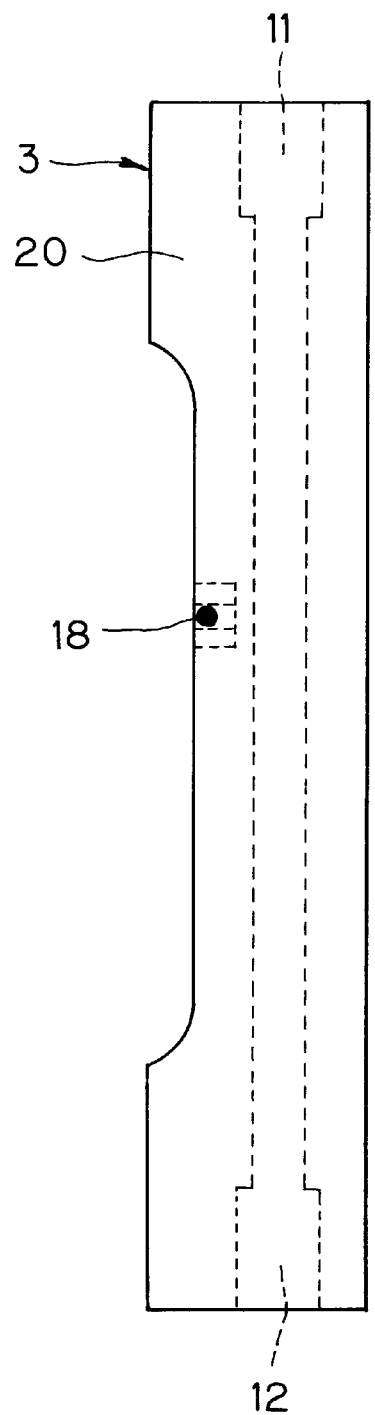
FIG. 15 is a cross sectional view taken along the line F–F'.

FIG. 11 and FIG. 12 are the explanatory views of metallic mold surface high speed heating and cooling insert die piece 7 shown in FIG. 10. The electric casting layer 9 as the metallic mold surface material layer in contact with the product visible face is made of Ni—Cr, and the metallic mold temperature detection sensor 18 is buried in the interior, and moreover, the metallic mold temperature adjusting thermal medium circulation pipe channel 8 is formed. This metallic mold temperature detection sensor 18 was directly buried in (assembled) at the position of 0.5 mm from the surface of metallic mold so that it may become the position as much close as possible to the surface of metallic mold inside the metallic mold surface electric casting layer 9 in the midway of molding of metallic mold surface electric casting layer 9, and moreover is shielded with the electric casting layer 9 for its formation integral with the surface of metallic mold so that the temperature close to the surface temperature of metallic mold may be measured. After the pipe channel stripe was formed with the lost wax on the metallic mold internal face of metallic mold surface electric casting layer 9, this surface was shielded with the electric casting layer 9, then the lost wax was eluted for its cavitation, and the metallic mold temperature adjusting thermal medium circulation pipe channel 8 was structured integrally with the metallic mold surface electric casting layer 9.

The cross section of metallic mold temperature adjusting thermal medium circulation pipe channel 8 is the square of 5 mm×5 mm, and its pitch is 12 mm. The distance between the surface of this metallic mold temperature adjusting thermal medium circulation pipe channel 8 and the surface of metallic mold surface high speed heating and cooling insert die piece 7 in contact with the product was set to 2 mm. In addition, a heat insulation layer 10 being structured of the epoxy and reinforcing material of the thickness of around 2 mm was installed to the rear face of metallic mold temperature adjusting thermal medium circulation pipe channel 8, and the thermal capacity was structured to a small size by isolating thermally the metallic mold portion conducting the speedy heating and cooling.

Using the unit of FIG. 10 and the temperature detection sensor that was installed separately for experiment on the surface of metallic mold, the outputs of metallic mold temperature adjusting medium heating unit 15 and the metallic mold temperature adjusting medium cooling unit 16 were controlled and the medium temperature flowing inside the metallic mold temperature adjusting thermal medium circulation pipe channel 8 was controlled so that the surface temperature of metallic mold might become 100° C. on the basis of the surface temperature of metallic mold being detected by this temperature detection sensor. FIG. 13 shows the comparison of detection temperatures of the temperature detection sensor that was separately installed for experiment on the surface of metallic mold at this time and the metallic mold temperature detection sensor 18 that was previously buried in adjacent to the surface of metallic mold inside the metallic mold surface electric casting layer 9 of metallic mold surface high speed heating and cooling insert die piece 7 and was formed integral with the surface of metallic mold.

The detection temperature of metallic mold temperature detection sensor 18 when the detection temperature of temperature detection sensor separately installed for experiment on the surface of metallic mold reaches 100° C. of preset metallic mold temperature was 102° and the difference of both the detection temperatures was small at 2° C., and moreover the time difference of both the detection temperatures when the detection temperature reached the maximum temperature was extremely small at 1 second: In this say, the difference of both the temperature detection sensors proved negligible in both the temperature and time.

[Embodiment 4]

Using the unit of FIG. 10, the metallic mold temperature controller 17 was set so that the product visible face side metallic mold surface temperature may become 120° C. when being heated and may become 60° C. when being cooled, and the surface temperature of metallic mold during the heating was measured. The maximum temperature indicated by the temperature detection sensor 18 during the heating was 121° C. and the maximum of surface temperature of metallic mold was 122° C., and the difference with the preset temperature of metallic mold temperature controller 17 proved to be the high control accuracy at 2° C. (the error of 2%).

Further, the time required for the heating was 18 seconds and the time required for the cooling was 25 seconds.

[Embodiment 5]

Figure 16:
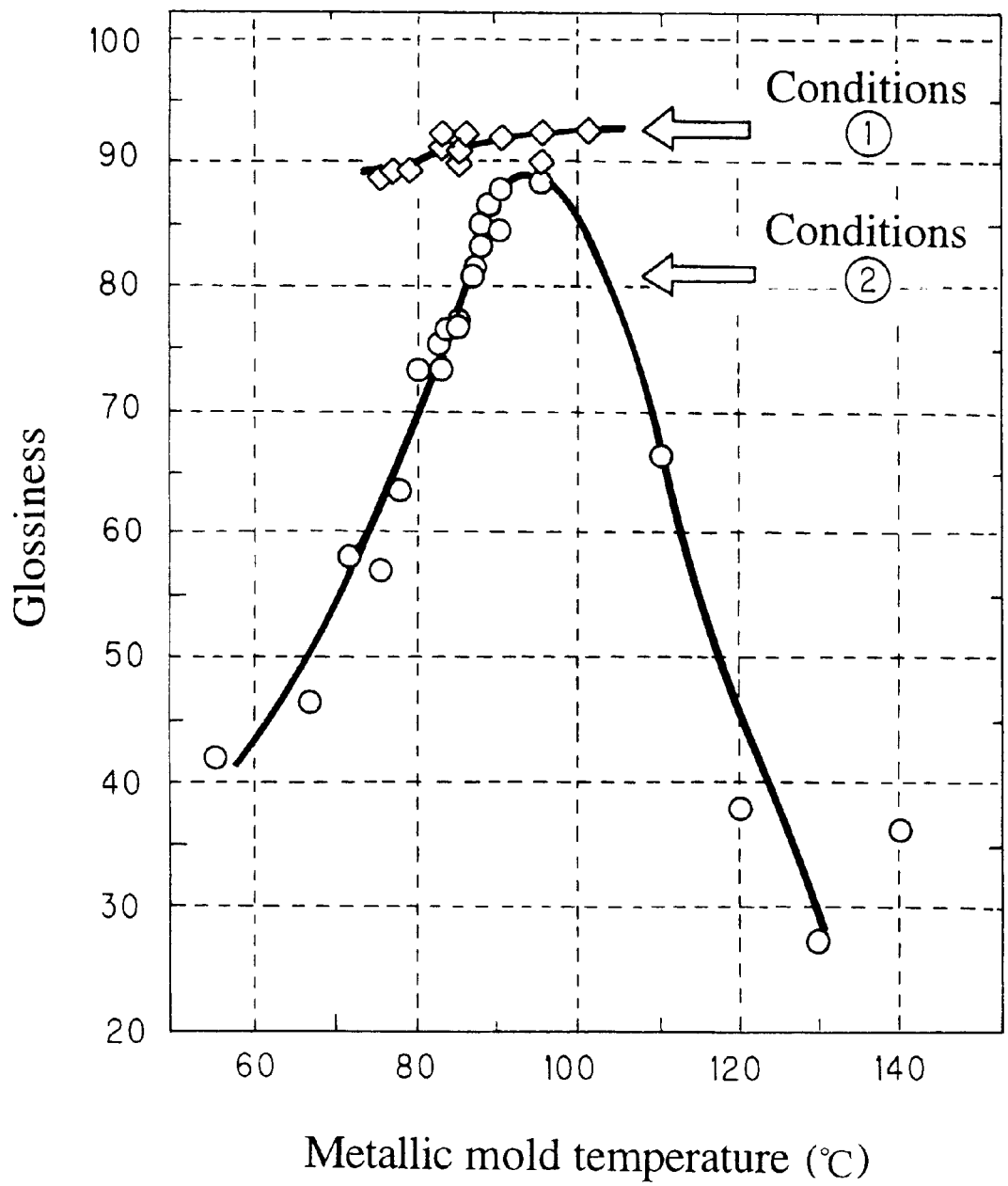
FIG. 16 is an explanatory view of comparison example of glossiness.

Using the unit of FIG. 10 and the ABS resin (15G20, glass transfer temperature at 98° C., Japan Synthesis Rubber) containing 20% of glass filler, the preset temperature of metallic mold surface controller 17 was changed and the injection molding was conducted so that the product visible face side metallic mold surface temperature might become around the resin glass transfer temperature. The surface temperature of metallic mold at this time was set to the conditions (conditions (1)) of cooling it down within a short time after heating it up until the completion of resin charging. Further, the molding cycle (injection—pressure holding—cooling—taking out the product) at this time was 60 seconds, the time required for the heating was 18 seconds, the time required for the cooling was 25 seconds, and the temperature raising speed of surface temperature of metallic mold was set to 2° C. every second with the temperature lowering speed being set to 2° C. every second. FIG. 16 shows the visible face glossiness measured result of obtained product.

Under the said conditions (1), the product face glossiness became the maximum value at 92 with the preset temperature of metallic mold temperature controller 17 being 100° C., the surface temperature of metallic mold during the resin charging being 101° C. higher than the glass transfer temperature of resin and moreover the temperature rising and cooling speed being at 2° C. every second, and the product of high luster could be obtained though the resin contained the glass filler. The luster is the index of transcription property, and a high transcription property could be obtained by speedily cooling down the mold face after accurately heating it up higher than the glass transfer temperature of resin. In addition, the product has been sufficiently solidified at the point of time when taking out the product, and there were no deformation and mold separation problems such as the cumber and the like of product.

[Embodiment 6]

Figure 17:
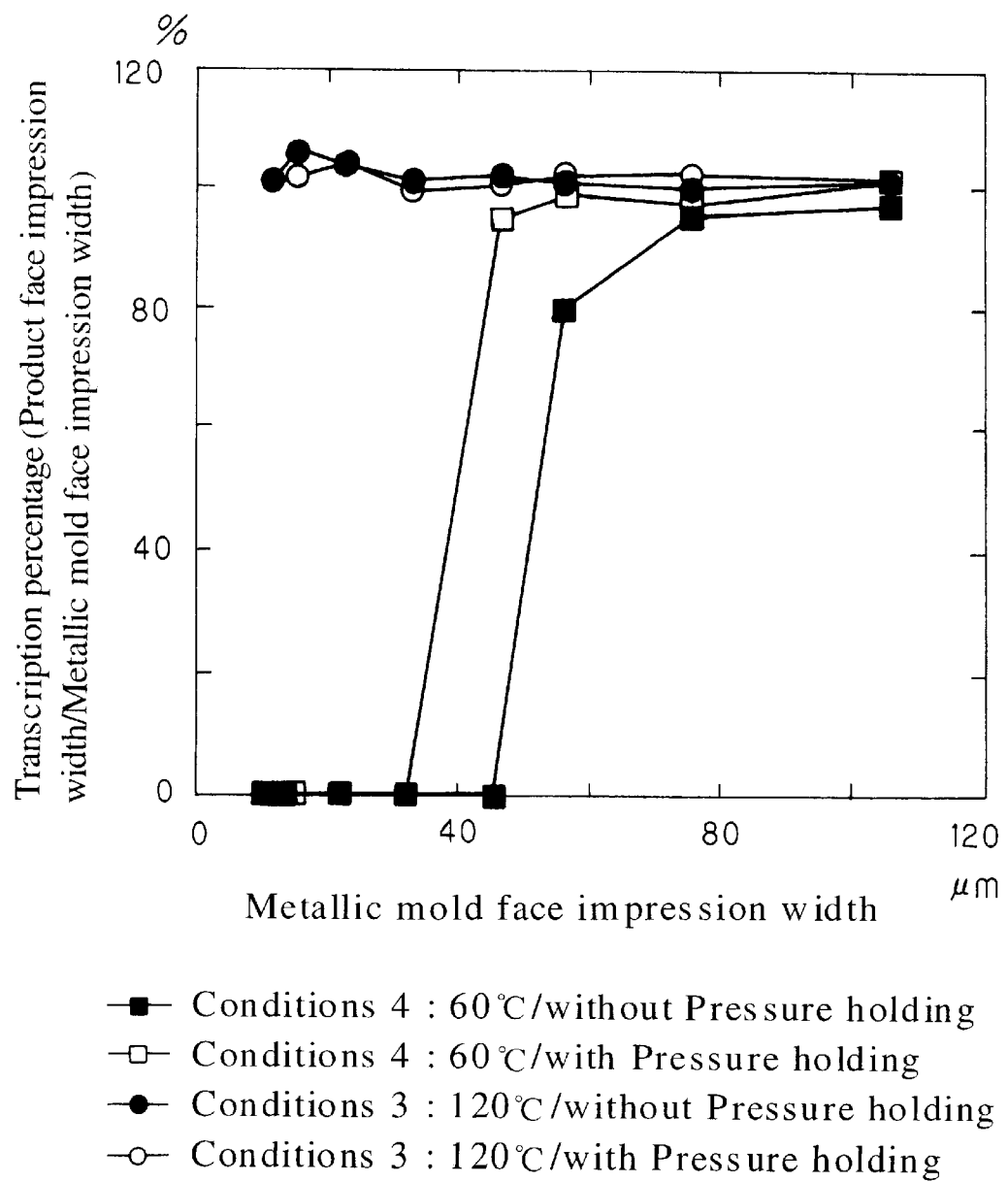
FIG. 17 is an explanatory view of comparison example of transcription percentage.

Using the same unit as that of Embodiment 5 and the impact resistance polystyrene (HT560, glass transfer temperature at 97° C., Idemitsu Petroleum Chemical), the preset temperature of metallic mold temperature controller 17 was set to 120° C. during the resin charging and to 60° C. during the cooling so that the product visible face side metallic mold surface temperature might become higher than the resin glass transfer temperature, and the injection molding was conducted while speedily heating it up and cooling it down (conditions (3)). Further, the molding cycle (injection—pressure holding—cooling—taking out the product) at this time was 60 seconds, the time required for the heating was 18 seconds, the time required for the cooling was 25, and the temperature raising speed of surface temperature of metallic mold was set to 3° C. every second with the temperature lowering speed being set to 2° C. every second. For information, the square cone shape impressions different in size were previously given to the surface of metallic mold with a diamond tip, the width of impressions on the metallic mold surface and the resin surface was measured, and the transcription property was evaluated with the percentage of this width (resin surface impression width/metallic mold surface impression width) as the transcription percentage. FIG. 17 shows the measured result of impression transcription percentage of obtained product and metallic mold.

Under the said conditions (3), the transcription percentage showed a high value at approximately 100% in any of the square cone shape impressions different in size from 10 microns to 100 microns. In addition, the transcription percentage remained almost the same under any of the conditions of presence or absence of pressure holding, and a high transcription percentage could be obtained at a low pressure without requiring any pressure holding.

[Embodiment 7]

The metallic mold temperature detection sensor 18 of Embodiment 3 is buried in at the position close to the surface of metallic mold inside the metallic mold surface electric casting layer 9 in the midway of forming the metallic mold surface electric casting layer 9, but it can also be installed between the metallic mold surface electric casting layer 9 and the heat insulation layer 10 if the metallic mold surface electric casting layer 9 is thin and the temperature difference between the rear face of metallic mold surface electric casting layer 9 and the surface of metallic mold should be small.

The metallic mold temperature detection sensor 18 of Embodiment 3 can also form the different kinds of metals on the metallic mold surface itself by the deposition or the elution injection, etc. into the electrode status, and use it as the thin film temperature detection sensor.

COMPARISON EXAMPLE 4

Using the same experiment unit as that of Embodiment 3, the temperature detection sensor incorporating the insert die was installed, together with the insert die, on to the surface of metallic mold for experiment and moreover the temperature detection sensor was installed inside the thermal medium pipe channel of metallic mold temperature adjusting machine, thus detecting the temperature. The outputs of metallic mold temperature adjusting thermal medium heating unit 15 and the metallic mold temperature adjusting thermal medium cooling unit 16 was controlled and the medium temperature flowing inside the metallic mold temperature adjusting thermal medium circulation pipe channel 8 was controlled so that the surface temperature of metallic mold might become 100° C. on the basis of the surface temperature of metallic mold being detected by the temperature detection sensor that was separately installed for experiment on the surface of metallic mold. FIG. 13 shows the detection temperatures of the temperature detection sensor that was incorporated, together with the insert die, on to the surface of metallic mold at this time and also the temperature detection sensor that was installed inside the thermal medium pipe channel of metallic mold temperature adjusting machine.

The detected temperature of temperature detection sensor that was incorporated, together with the insert die, on to the surface of metallic surface when the detected temperature of temperature detection sensor installed separately for experiment on to the surface of metallic mold has reached 100° C. that is the preset metallic mold temperature was 89° C., and the difference between both the detected temperatures was great at 11° C., and the timely difference of both the detected temperatures when the detected temperature has reached the maximum temperature was also 2 seconds, thus the difference between both the temperature detection sensors was great both in terms of the temperature and time. In the similar manner, the detected temperature of temperature detection sensor installed inside the thermal medium pipe channel of metallic mold temperature adjusting machine was great in its difference at 16° C. from the surface temperature of metallic mold, and the timely difference when its temperature has reached the maximum temperature was also great at 3 seconds between both the temperature detection sensors both in terms of the temperature and time.

COMPARISON EXAMPLE 5

Using the same unit as that of Embodiment 2 except for changing the metallic mold temperature detection sensor to the temperature detection sensor that was incorporated, together with the insert die, on to the surface of metallic mold of Comparison Example 1 from the metallic mold temperature sensor 18 that was buried in adjacent to the surface of metallic mold inside the metallic mold surface electric casting layer 9, the metallic mold temperature controller 17 was set and the surface temperature of metallic mold during its heating was measured so that the surface temperature of product visible face side metallic mold may become 120° C. during its heating and may become 60° C. during its cooling. The maximum temperature indicated by the temperature detection sensor incorporated, together with the insert die, on to the surface of metallic mold during its heating was 119° C., the maximum of metallic mold surface temperature was 128° C., the difference from the preset temperature of metallic mold temperature controller 17 was 8° C. (error of 7%), thus proving to be a low temperature control accuracy.

Further, the time required for the heating was 21 seconds, the time required for the cooling was 29 seconds, thus the time became longer by 7 seconds (or 16%) as compared with that of Embodiment 2.

COMPARISON EXAMPLE 6

Using the same experiment unit and resin as those of Embodiment 5, the preset temperature of metallic mold temperature controller 17 was changed to conduct the injection molding so that the surface temperature of product visible face side metallic mold might become the level around the resin glass transfer temperature. At this time, the surface temperature of metallic mold was set to such conditions that it might be controlled to a constant temperature from the charging of resin to its cooling (Condition (2)). Further, the molding cycle (injection—pressure holding—cooling—taking out the product) at this time was 60 seconds, the time required for the heating was 18 seconds, the time required for the cooling (the heating temperature being held at a constant temperature) was 25 seconds, and the temperature rasing speed of metallic mold surface temperature was set to 2° C. every second while the temperature lowering was set to 0° C. every second for maintaining the heating temperature at a constant temperature. FIG. 16 shows the visible face glossiness measured result of obtained product.

Even under the said conditions (2), the product of high luster could be obtained though the glossiness of product visible face was about 90 containing the glass filler when the surface temperature of metallic mold was in the vicinity of glass transfer temperature of resin, but the glossiness fell down as compared with Embodiment 3. Further, if the surface temperature of metallic mold should be raised higher than the glass transfer temperature of resin, the glossiness of product visible face conspicuously fell down, and moreover at the point of time when taking out the product, the product didn't get sufficiently solidified, thus there appeared the deformation and mold separation problems like the cumber and so forth of product.

COMPARISON EXAMPLE 7

Using the same unit and resin of Embodiment 3 except for replacing the metallic mold surface high speed heating and cooling insert die piece 7 of Embodiment 5 into the steel material insert die piece 19 made of S55C that simulated the usual metallic mold structure where two metallic mold temperature adjusting thermal medium circulation pipe channel 8 are machined in tunnel status, and moreover replacing the temperature sensor being input into the metallic mold temperature controller 17 with the temperature detection sensor 18 incorporating the steel material insert die piece 19 together with the insert die on to the surface, the preset temperature of metallic mold temperature controller 17 was changed to conduct the injection molding so that the product visible face side during the resin charging might become the level around the resin glass transfer temperature. When the preset temperature of metallic mold temperature controller 17 has been set to 87° C. and the surface temperature of metallic mold is at 100° C. which is higher than the glass transfer temperature of resin, the luster of product face indicated the maximum value, and even if the surface temperature should be lower than or higher than the said value, the glossiness or the transcription property tended to fall down. The molding cycle (injection—pressure holding—cooling—taking out the product) at this time was 84 seconds, the time required for the heating was 39 seconds, the time required for the cooling was 40 seconds and the temperature raising speed of metallic mold surface temperature was 1° C. every second with the temperature lowering speed being 1° C. every second. The molding cycle was elongated by 40% as compared with that of Embodiment 2. The glossiness measured result of product visible face also fell down to the glossiness of 88 as compared with the product luster ° C. 92 in Embodiment 5.

COMPARISON EXAMPLE 8

Using the same unit and resin as those of Embodiment 6, the injection molding was conducted with the preset temperature of metallic mold temperature controller 17 being kept to the constant level of 60° C. (conditions (4)). FIG. 17 shows the measured result of impression transcription percentage of obtained product and metallic mold.

Under the said conditions (4), the transcription percentage became 0% in the square cone shape impression smaller than 30 microns. Further, under the conditions of holding pressure presence, the transcription percentage could be slightly improved as compared with the condition of holding pressure absence, but the high transcription percentage as found in Embodiment 6 could not be obtained.

COMPARISON EXAMPLE 9

Using the same unit as that of Embodiment 4 except for replacing the metallic mold surface high speed heating and cooling insert die piece 7 with the steel material insert piece 19 made of S55C simulating the structure of usual metallic mold where two metallic mold temperature adjusting thermal medium circulation pipe channels 8 are machined to tunnel status and changing the temperature sensor being input into the metallic temperature controller 17 to the temperature detection sensor 18 that was assembled together with insert die on to the surface of steel material insert die 19, the metallic mold temperature controller 17 was set so that the surface temperature of product visible face side metallic mold may become 120° C. during the heating and become 60° C. during the cooling, and the surface temperature of metallic mold during the heating was measured. The maximum temperature indicated by the metallic mold temperature detection sensor 18 installed to the rear face side of steel material insert die piece 19 during the heating was 122° C., the maximum of surface temperature of metallic mold was 137° C., the surface temperature of metallic mold became by far higher than the aimed temperature, and the difference with the preset temperature of metallic mold temperature controller 17 was great at 17° (error 17%), which proved to be a low temperature control accuracy.

Further, the time required for the heating was 76 seconds, the time required for the cooling was 77 seconds, thus the cycle became so long as 256%, and the energy loss was great by extra heating and cooling was conducted against the necessary surface temperature of metallic mold.

What is claimed is:

1. A method for obtaining at a low pressure high transcription plastic products with a metallic molding of plastic product using a metallic mold, the method comprising the steps of:

closing the metallic mold;

injecting a plastic product resin material into the closed mold;

subsequent to said step of injecting, maintaining the pressure in the mold at a fill level for a period of time;

cooling the mold;

opening the metallic mold;

removing the molded product from the opened metallic mold;

controlling the temperature of heating the metallic mold within a short time and in high speed with the metallic mold surface temperature, in contact with the product, being raised more than 2° C. every second until said metallic mold surface temperature is at a level higher than the glass transfer temperature of the resin if the resin material is non-crystal and being raised more than 2° C. every second until said metallic mold surface temperature is at a level higher than the fusion point temperature of resin if the material resin is crystal;

maintaining said metallic mold surface temperature during said step of injecting, subsequent to reaching one of said level higher than the glass transfer temperature and said level higher than the fusion point temperature; and after the completion of injecting, cooling down said metallic mold surface temperature within a short time and at a high speed with the temperature lowering speed of more than 2° C. every second.

2. The injection molding method according to claim 1, wherein said step of controlling the temperature of heating and said step of cooling are limited to heating and cooling only a part of the metallic mold surface in contact with the product.

3. The injection molding method according to claim 1, wherein said step of controlling the temperature of heating and said step of cooling are limited to heating and cooling only a part of the metallic mold surface in contact with the product visible face side.

4. The injection molding method according to claim 1, further comprising the steps of:

dividing the metallic mold surface range to be temperature controlled into plural portions in controlling the heating and cooling temperatures of said metallic mold surface at a high speed and molding the product with the different heating temperature for the portions, different cooling temperature for the portions or different temperature controlling times for the portions.

5. A method for obtaining at a low pressure high transcription plastic products with a metallic molding of plastic product using a metallic mold, the method comprising the steps of:

closing the metallic mold;

injecting a plastic product resin material into the closed mold;

subsequent to said step of injecting, maintaining the pressure in the mold at a fill level for a period of time;

cooling the mold;

opening the metallic mold;

removing the molded product from the opened metallic mold;

directly incorporating a temperature detection sensor in close proximity to the surface of molding surface material layer of metallic mold;

heating and cooling the metallic mold using a thermal medium pipe channel integrally provided in the metallic mold, the thermal pipe carrying thermal medium;

controlling the temperature of heating and cooling by supplying thermal medium to the thermal medium pipe channel of metallic mold from a metallic mold temperature adjusting machine based on the molding surface temperature of metallic mold detected with the temperature detection sensor, and also controlling the temperature to a level higher than the fusion point temperature of resin if the material resin is crystal, and to a level higher than the glass transfer temperature of resin if the material resin is non-crystal including controlling the heating thermal medium so that the surface temperature of metallic mold has a temperature rising speed of more than 2° C. every second during said step of injection, up to said level, and after maintaining this temperature during further injection, controlling the temperature of cooling thermal medium being supplied to the metallic mold after the completion of injection so that the surface temperature of metallic mold may lowered at a rate of more than 2° C. every second.

6. The injection molding method according to in claim 5, wherein said step of controlling the temperature includes following a temperature profile to set with a metallic mold temperature controller and limiting the surface portion of the metallic mold being heated and cooled to a part of surface of metallic mold in contact with the product or to the surface of metallic face in contact with the product visible face side.

7. The injection molding method according to claim 5, wherein said step of controlling the temperature is based on dividing the range for controlling the high speed heating and cooling temperatures into plural groups, providing an individual temperature detection sensor and the thermal medium pipe channel for every group and molding the product with the heating temperature, cooling temperature control profile that is different for each group.

8. The injection molding method according to claim 6, wherein said step of controlling the temperature is based on dividing the range for controlling the high speed heating and cooling temperatures into plural groups, providing an individual temperature detection sensor and the thermal medium pipe channel for every group and molding the product with the heating temperature, cooling temperature control profile that is different for each group.

9. The plastic injection molding method according to claim 5, wherein the thermal medium pipe channel is formed inside a molding surface material layer.

10. A method for obtaining at a low pressure high transcription plastic products with a metallic molding of plastic product using a metallic mold, the method comprising the steps of:

closing the metallic mold;

injecting a plastic product resin material into the closed mold;

subsequent to said step of injecting, maintaining the pressure in the mold at a fill level for a period of time;

cooling the mold;

opening the metallic mold;

removing the molded product from the opened metallic mold;

controlling the temperature of heating the metallic mold within a short time and in high speed with the metallic mold surface temperature, in contact with the product, being raised from about 2° C. every second to 3° C. every second until said metallic mold surface temperature is at a level higher than the glass transfer temperature of the resin if the resin material is non-crystal and being raised about 2° C. every second until said metallic mold surface temperature is at a level higher than the fusion point temperature of resin if the material resin is crystal;

maintaining said metallic mold surface temperature during said step of injecting, subsequent to reaching one of said level higher than the glass transfer temperature and said level higher than the fusion point temperature; and after the completion of injection, cooling down said metallic mold surface temperature within a short time and at a high speed with the temperature lowering speed of more than 2° C. every second.

11. The plastic injection molding method according to claim 10, further comprising the steps of:

directly incorporating a temperature detection sensor in close proximity to the surface of molding surface material layer of metallic mold;

using a thermal medium pipe channel integrally provided in the metallic mold, the thermal pipe carrying thermal medium, for heating and cooling the metallic mold;

controlling the temperature of heating and cooling by supplying thermal medium to the thermal medium pipe channel of metallic mold from a metallic mold temperature adjusting machine based on the molding surface temperature of metallic mold detected with the temperature detection sensor.

12. The plastic injection molding method according to claim 10, wherein the metallic mold temperature adjusting machine is set to increase the molding surface temperature of 2° per second during the step of heating and a is set for a lowering of molding surface temperature of 2° per second during the step of cooling.

13. The plastic injection molding method according to claim 10, wherein the metallic mold temperature adjusting machine is set to increase the molding surface temperature of 3° per second during the step of heating and a is set for a lowering of molding surface temperature of 2° per second during the step of cooling.

14. The plastic injection molding method according to claim 12 wherein the time required for heating is about 18 seconds.

15. The plastic injection molding method according to claim 13 wherein the time required for heating is about 18 seconds.

16. The plastic injection molding method according to claim 12 wherein the time required for cooling is about 25 seconds.

17. The plastic injection molding method according to claim 13 wherein the time required for cooling is about 25 seconds.

18. The plastic injection molding method according to claim 12 wherein the time for closing the metallic mold, injecting a plastic product resin material into the closed mold, maintaining the pressure in the mold at a fill level, cooling the mold, opening the metallic mold and removing the molded product from the opened metallic mold is set at about 60 seconds.

19. The plastic injection molding method according to claim 13 wherein the time for closing the metallic mold, injecting a plastic product resin material into the closed mold, maintaining the pressure in the mold at a fill level, cooling the mold, opening the metallic mold and removing the molded product from the opened metallic mold is set at about 60 seconds.

20. The plastic injection molding method according to claim 5 wherein the controlling of the temperature is to a level higher than the fusion point temperature of resin if the material resin is crystal, and to a level higher than the glass transfer temperature of resin if the material resin is non-crystal.

* * * * *